US011755756B1

(12) United States Patent
Cline et al.

(10) Patent No.: US 11,755,756 B1
(45) Date of Patent: *Sep. 12, 2023

(54) SENSITIVE DATA MANAGEMENT

(71) Applicant: Amazon Technologies, Inc., Seattle, WA (US)

(72) Inventors: Jason Cline, Bellevue, WA (US); Yolando Pereira, Seattle, WA (US); Arvind Kumar Babel, Seattle, WA (US); Bharanidharan Arul Janakiammal, Seattle, WA (US); Rohan Manish Chandra, Seattle, WA (US); Gary Scot Henderson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/993,707

(22) Filed: Aug. 14, 2020

Related U.S. Application Data

(63) Continuation of application No. 16/140,334, filed on Sep. 24, 2018, now Pat. No. 10,747,894.

(51) Int. Cl.
*G10L 15/22* (2006.01)
*G06F 21/62* (2013.01)
*G10L 13/00* (2006.01)

(52) U.S. Cl.
CPC .......... *G06F 21/6209* (2013.01); *G10L 13/00* (2013.01); *G10L 15/22* (2013.01); *G10L 2015/225* (2013.01)

(58) Field of Classification Search
CPC .............. G06F 21/6209; G10L 15/22–15/228
See application file for complete search history.

(56) References Cited

U.S. PATENT DOCUMENTS

| 10,354,653 | B1 | 7/2019 | Vijayvergia et al. |
| 10,747,894 | B1 * | 8/2020 | Cline ..................... G10L 15/22 |
| 2004/0006476 | A1 * | 1/2004 | Chiu ................... H04M 3/4936 704/E15.044 |
| 2013/0332367 | A1 | 12/2013 | Quigley et al. |
| 2015/0381571 | A1 * | 12/2015 | Plasse .................... G16H 40/67 726/26 |
| 2016/0261532 | A1 * | 9/2016 | Garbin .................. H04L 51/063 |
| 2017/0178234 | A1 * | 6/2017 | Jezek, Jr. .............. G06Q 40/04 |
| 2018/0213396 | A1 | 7/2018 | Segal et al. |
| 2019/0138267 | A1 | 5/2019 | Mailey |
| 2019/0384924 | A1 * | 12/2019 | Adams ................ G06F 21/6209 |
| 2020/0082125 | A1 * | 3/2020 | VanBlon ............. G06F 21/6245 |
| 2020/0410980 | A1 * | 12/2020 | Yamada ................. G06F 3/167 |

* cited by examiner

*Primary Examiner* — Abul K Azad
(74) *Attorney, Agent, or Firm* — Lee & Hayes, P.C.

(57) ABSTRACT

Systems and methods for sensitive data management are disclosed. A voice-enabled device may generate audio data representing a request from a user utterance. A remote system may perform speech-processing operations, including obtaining responsive text data from a third-party application. In examples, a sensitivity designation may be received from the third-party application, which may cause the remote system to encrypt the responsive text data, redact the text data, and/or remove the text data from the remote system after the response is provided to the voice-enabled device.

20 Claims, 9 Drawing Sheets

SENSITIVE DATA MANAGEMENT

RELATED APPLICATIONS

This application claims priority to and is a continuation of U.S. patent application Ser. No. 16/140,334, filed on Sep. 24, 2018, the entire contents of which are incorporated herein by reference.

BACKGROUND

Voice-enabled devices may be used to request information. Users of the voice-enabled devices and/or providers of the information may desire to safeguard such information. Described herein are improvements in technology and solutions to technical problems that can be used to, among other things, safeguard requested information.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
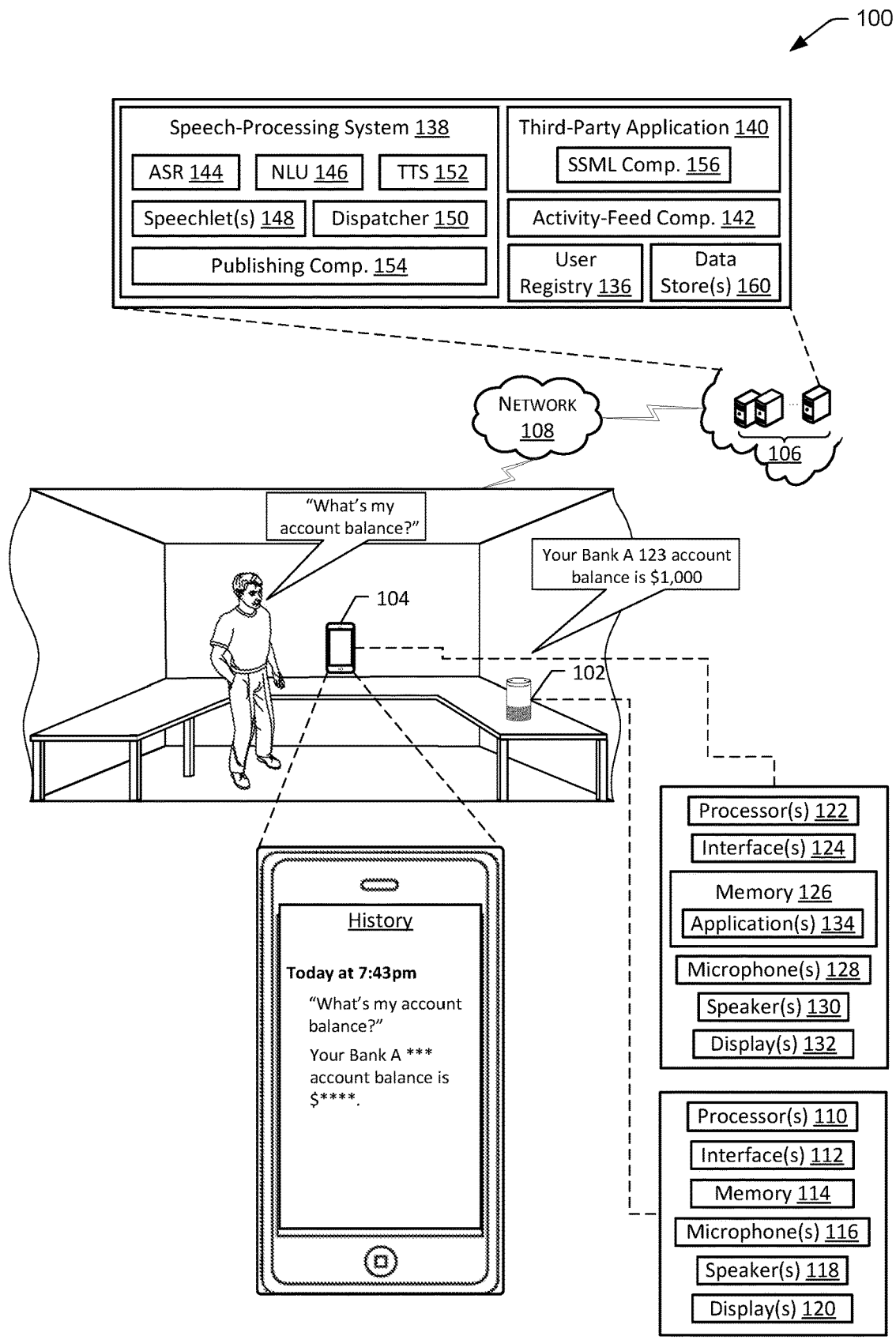
FIG. 1 illustrates a schematic diagram of an example environment for sensitive data management.

Systems and methods for sensitive data management are disclosed. Take, for example, an environment, such as a home, that includes one or more computing devices. The computing devices may be, for example, voice-enabled devices such as voice-enabled personal assistant devices, hub devices, personal devices such as mobile phones, and/or one or more other devices capable of sending and receiving data from one or more other devices. Using a voice-enabled device by way of example, a user may speak a user utterance requesting information. For example, the user utterance may be "what's the balance of my bank account?" and/or "when is my doctor appointment scheduled?" Microphones of the voice-enabled device may capture audio corresponding to the user utterance and may generate audio data. The audio data may be sent from the voice-enabled device to a remote system for speech processing.

The remote system, including a speech-processing system of the remote system, may generate text data corresponding to the audio data and may utilize the text data to generate intent data. In examples, the remote system may generate intent data representing the audio data, such as without generating and/or utilizing text data. The intent data may indicate that the user utterance corresponds to a request, such as the requests illustrated above. In examples, the request may be associated with an intent that one or more third-party applications are configured to provide responses to. In these examples, the speech-processing system may send the intent data and/or other data indicating and/or associated with the request to a speechlet, which may communicate with the third-party application to obtain a response to the request. For example, the speechlet and/or a dispatcher may send the intent data and/or the text data generated by the speech-processing system to the third-party application. The third-party application may analyze the intent data and/or the text data and may generate responsive text data representing a response to the request. Using the example provided herein, the responsive text data may include "your Bank A account 1234 has a balance of $1,000" and/or "your doctor appointment at Hospital A is tomorrow at 9:00 am." The third-party application may send this text data back to the speechlet and/or the dispatcher.

In addition to the responsive text data, the third-party application may also identify, determine, and/or generate designation data and send that designation data to the speechlet and/or dispatcher. For example, the designation data may indicate a portion of the text data that is sensitive and should be treated with a degree of confidentiality and/or sensitivity. The designation data may be in the form of speech synthesis markup language (SSML) tags, which may be identified, determined, and/or generated by the remote system and made available to the third-party application for sensitivity designation. The SSML tags may be associated with various sensitivity levels, which may be utilized to indicate how sensitive a particular portion of responsive text data is. The differing sensitivity level designations may be utilized by the remote system to determine how to encrypt data, how to store data, and/or how to redact data associated with the responsive text data.

The remote system, having received the responsive text data and the designation data, may then identify the portion(s) of the responsive text data designated as sensitive. The text data may be encrypted in examples where the designation data indicates that at least a portion of the text data is sensitive. The encrypted text data may be sent to a validation component, which may attempt to validate the text data as a response to the request. A text-to-speech component of the remote system may then generate audio data that corresponds to the text data. In examples, the audio data may be encrypted based at least in part on the text data being encrypted and/or based at least in part on the designation data. The audio data may represent an audible response to the user utterance. The audio data may be sent to the voice-enabled device for output of corresponding audio by one or more speakers of the voice-enabled device.

As such, the voice-enabled device may provide a response to the user utterance that audibly presents the sensitive information.

Additionally, based at least in part on the response being designated as sensitive, once the audio data is sent to the voice-enabled device, the audio data may be removed from the remote system, such as by being deleted from memory associated with the remote system and/or caches associated with the remote system. In this way, the audio data is maintained by the remote system just long enough to provide an audible response to the voice-enabled device, but then is removed to avoid long-term storage of the sensitive information associated with the response.

Additionally, the remote system may generally send the request text data, the responsive text data, and/or the audio data to an activity-feed component of the remote system. The activity-feed component may be configured to store the request text data, the responsive text data, and/or the audio data such that a history of interactions with the voice-enabled device is maintained. Generally, a user may access the data stored in association with the activity-feed component, such as using a personal device with access to an application associated with the voice-enabled device. The personal device may display a history of the interactions, which may include text representing requests, text representing responses to the requests, and/or options for outputting audio representing the requests and/or the responses. However, in examples where the response includes sensitive information, a publishing component of the remote system, which is configured to publish the text data and audio data to the activity-feed component, may be configured to redact the text data and/or the audio data before publishing. For example, the designation data may be utilized to identify the portion of a given response that is sensitive. The publishing component may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data. The redacted text data may be sent to and stored with respect to the activity-feed component. In these examples, when user input indicates a request to view the above-identified interaction with the voice-enabled device, redacted text corresponding to the redacted text data may be displayed.

In examples, the sensitivity level associated with the designation data may inform the redaction process described above. For example, for a given sensitivity level designation, the responsive text data may be redacted as outlined above. In other examples with a more sensitive designation, the responsive text data may be removed from the remote system and may be replaced with text data indicating that the responsive text data is not available in light of its sensitivity. In these examples, when user input indicates a request to view the above-identified interaction with the voice-enabled device, the text data indicating that the responsive text data is not available may be displayed instead of the responsive text data. In this way, the user may see that an interaction occurred, but may not see what the interaction was.

Additionally, or alternatively, the third-party application may provide designation data indicating that given requests and/or portions of requests are to be designated as sensitive. For example, a user utterance of "my personal identification number is 9999" includes sensitive information and may be designated as such by the third-party application. In these examples, the text data corresponding to this user utterance may be identified as sensitive and may be encrypted by the remote system before being sent to the third-party application. This encryption may provide a level of protection to the sensitive information in the request while being transmitted between the remote system and the third-party application. In these examples, the text data representing this request may be published to the activity-feed component in a redacted form and/or the text data may be deleted from the remote system and replaced with text data indicating that the text representing the request is not available in light of its sensitivity.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for sensitive data management. The system 100 may include, for example, a voice-enabled device 102 and/or a personal device 104. The voice-enabled device 102 may be configured to receive user utterances and perform operations in response to such user utterances. In these examples, the voice-enabled device 102 may be "hands free" such that interactions with the device are performed through audible requests and responses. Additionally, the personal device 104 may be, for example, a mobile phone, which may be associated with the voice-enabled device 102 and may communicate directly with the voice-enabled device, one or more the accessory devices (not depicted), and/or a remote system 106.

The voice-enabled device 102, the personal device 104, and/or the accessory devices may be configured to send data to and/or receive data from the remote system 106, such as via a network 108. In examples, voice-enabled device 102, the personal device 104, and/or the accessory devices may communicate directly with the remote system 106, via the network 108. In other examples, the personal device 104 may communicate with the voice-enabled device 102, and the voice-enabled device 102 may communicate with the remote system 106.

The voice-enabled device 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the remote system 106. The displays 120 may be configured to present images, such as images corresponding to image data received from another device and/or the remote system 106.

The personal device 104 may include one or more components, such as, for example, one or more processors 122, one or more network interfaces 124, memory 126, one or more microphones 128, one or more speakers 130, and/or one or more displays 132. The microphones 128, the speakers 130, and/or the displays 132 may perform the same or similar functions as the microphones 116, the speakers 118, and/or the displays 120, respectively, associated with the voice-enabled device 102. The memory 126 may include components such as, for example, one or more applications 134 residing on the memory 126 and/or accessible to the personal device 104. The application(s) 134 may be configured to cause the processor(s) 122 to receive information associated with interactions with the voice-enabled device 102 and cause the display(s) 132 to display representations, such as text and/or images, associated with the interactions. The application(s) 134 may also be utilized, in examples, to receive input data, such as from a user of the personal device 104, and send the input data and/or instructions associated with the input data to the remote system 106.

The remote system 106 may include components such as, for example, a user registry 136, a speech-processing system 138, a third-party application 140, an activity-feed component 142, and/or one or more data stores 160. The speech-processing system 136 may include an automatic speech recognition (ASR) component 144, a natural language understanding (NLU) component 146, one or more speechlets 148, a dispatcher 150, a text-to-speech (TTS) component 152, and/or a publishing component 154. The third-party application 140 may include components such as, for example, a speech synthesis markup language (SSML) component 156. Each of the components described herein with respect to the remote system 106 may be associated with their own systems, which collectively may be referred to herein as the remote system 106, and/or some or all of the components may be associated with a single system. The components of the remote system 106 are described in detail below. In examples, some or each of the components of the remote system 106 may include their own processor(s), network interface(s), and/or memory. As such, by way of example, the speech-processing system 138 may include and/or be associated with processor(s), network interface(s), and/or memory. The third-party application 140 and/or the activity-feed component 142 may include and/or be associated with different processor(s), network interface(s), and/or memory, or one or more of these components may utilize some or all of the same processor(s), network interface(s), and/or memory utilized by the speech-processing system 138. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 136 may be configured to identify, determine, and/or generate associations between users, user accounts, and/or devices. For example, one or more associations between user accounts may be identified, determined, and/or generated by the user registry 136. The user registry 136 may additionally store information indicating one or more applications and/or resources accessible to and/or enabled for a given user account. Additionally, the user registry 136 may include information indicating device identifiers, such as naming identifiers, associated with a given user account, as well as device types associated with the device identifiers. The user registry 136 may also include information indicating user account identifiers, naming indicators of devices associated with user accounts, and/or associations between devices, such as the voice-enabled device 102 and the personal device 104. The user registry 136 may also include information associated with usage of the voice-enabled device 102 and/or the personal device 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores 160 may be configured to identify, determine, and/or generate data associated with use of the voice-enabled device 102 and/or the personal device 104. For example, the voice-enabled device 102 may be utilized to provide responses to user requests and/or other interactions may occur between the voice-enabled device 102 and the personal device 104 and/or one or more users. Usage data may be identified, determined, and/or generated that indicates some or each of these interactions. Timing data may also be identified, determined, and/or generated that indicates a time at which some or each of these interactions took place. It should be understood that while the user registry 136 and the data stores 160 are illustrated as separate components, the user registry 136 and the data stores 160 may be the same component. In examples, the data stores 160 may store data utilized by the activity-feed component 142, as discussed more fully herein.

The speech-processing system 138 may be configured to receive audio data from one or more of the voice-enabled device 102 and/or the personal device 104 and perform speech-processing operations. For example, the ASR component 144 may be configured to generate text data corresponding to the audio data, and the NLU component 146 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "what's the balance of my Bank A account," the NLU component 146 may identify a "bank account balance" intent and the payload may be "Bank A." In this example where the intent data indicates an intent to receive information indicating an amount of money associated with a given account for Bank A, the speech-processing system 138 may call one or more of the speechlets 148 to effectuate the intent. For example, a speechlet 148 may be associated with Bank A and/or may have been developed by and/or in association with Bank A. The speechlet 148 may be designated as being configured to handle the intent of identifying bank account balances, for example. The speechlet 148 may receive the intent data and/or other data associated with the user utterance from the NLU component 146, such as by an orchestrator and/or a remote application component of the remote system 106, and may perform operations to instruct the voice-enabled device 102 and/or the personal device 104 and/or another device to provide information associated with the request.

The speechlet(s) described herein may include a speech-enabled web component that may run in the remote system 106. Speechlet(s) may receive and respond to speech-initiated requests. Speechlet(s) may define life-cycle events for an application as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

The dispatcher 150 may receive the intent data and/or other data associated with the request from the speechlet 148. The dispatcher 150 may be configured to identify and/or determine that the speechlet 148 and/or the request is associated with a third-party application 140, and the dispatcher 150 may send the intent data and/or the other data to the third-party application 140. For example, the dispatcher 150 may identify and/or determine that the request is associated with a third-party application 140 for Bank A. The third-party application 140 may have been developed by and/or in association with Bank A and/or may have been designated as corresponding to operations associated with Bank A. It should be understood that while the third-party application 140 is depicted as a component of the remote system 106, the third-party application 140 may be a component of a third-party system.

The third-party application 140 may receive the intent data and/or other data from the dispatcher 150 and may be configured to generate text data representing a response to the request. For example, the third-party application 140 may analyze the intent data and/or the text data as sent by the dispatcher 150 and may generate responsive text data representing a response to the request. Using the example provided herein, the responsive text data may include "your Bank A account 1234 has a balance of $1,000" and/or "your doctor appointment at Hospital A is tomorrow at 9:00 am." The third-party application 140 may send this text data back to the speechlet 148 and/or to the dispatcher 150.

In addition to the responsive text data, the third-party application 140 may also identify, determine, and/or generate designation data and send that designation data to the speechlet 148 and/or the dispatcher 150. For example, the designation data may indicate a portion of the responsive text data that is sensitive and should be treated with a degree of confidentiality and/or sensitivity. The designation data may be identified, determined, and/or generated by the SSML component 156 and may correspond to one or more SSML tags. The SSML tags may be identified, determined, and/or generated by the remote system 106 and may be made available to the third-party application 140 for sensitivity designation. The SSML tags may be associated with various sensitivity levels, which may be utilized to indicate how sensitive a particular portion of responsive text data is. The differing sensitivity level designations may be utilized by the remote system 106 to determine how to encrypt data, how to store data, and/or how to redact data associated with the responsive text data. In other examples, the SSML tags may be identified, determined, and/or generated by the third-party application 140 and may be provided to the remote system 106.

The dispatcher 150, having received the responsive text data and the designation data, may then identify the portion of the responsive text data designated as sensitive. The responsive text data may be encrypted by the dispatcher 150 in examples where the designation data indicates that at least a portion of the text data is sensitive. The encrypted text data may be sent to a validation component, which may attempt to validate the text data as a response to the request. The TTS component 152 may then generate audio data that corresponds to the text data. In examples, the audio data may be encrypted based at least in part on the text data being encrypted and/or based at least in part on the designation data. The audio data may represent an audible response to the user utterance. In examples, the audio data may be generated by the TTS component 152 and/or a subcomponent thereof. In other examples, the TTS component 152 may be utilized to format the responsive text data and to send the text data to an external system, which may return the corresponding audio data. The audio data representing the response may be sent to the voice-enabled device 102 for output of corresponding audio by one or more of the speakers 118 of the voice-enabled device 102. As such, the voice-enabled device 102 may provide a response to the user utterance that audibly presents the sensitive information. In other examples, the audio data may be sent to the personal device 104. In other examples, the response may be presented on displays 120 of the voice-enabled device 102 and/or on displays 132 of the personal device 104. In these examples, instead of audio data, the remote system 106 may send text data to be utilized to present text representing the response. The text may be caused to be displayed for a predetermined amount of time in instances where the response includes sensitive information.

Additionally, based at least in part on the response being designated as sensitive, once the audio data is sent to the voice-enabled device 102, the audio data may be removed from the remote system 106, such as by being deleted from memory associated with the remote system 106 and/or caches associated with the remote system 106. In this way, the audio data is maintained by the remote system 106 just long enough to provide an audible response to the voice-enabled device 102, but then is removed to avoid long-term storage of the sensitive information associated with the response.

Additionally, the request text data, the responsive text data, and/or the audio data may be sent to the data stores 160. The activity-feed component 142 may be configured to retrieve the request text data, the responsive text data, and/or the audio data from the data stores 160 such that a history of interactions with the voice-enabled device 102 and/or the personal device 104 is available. Generally, a user may access the data stored in data stores 160, such as using the personal device 104 with access to the application 134. The personal device 104 may display a history of the interactions, which may include text representing requests, text representing responses to the requests, and/or options for outputting audio representing the requests and/or the responses. However, in examples where the response includes sensitive information, the publishing component 154 of the remote system 106, which may be configured to publish the text data and audio data to the data stores 160, may be configured to redact the text data and/or the audio data before publishing. For example, the designation data may be utilized to identify the portion of a given response that is sensitive. The publishing component 154 may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data. The redacted text data may be sent to and stored with respect to the data stores 160. In these examples, when user input indicates a request to view the above-identified interaction with the voice-enabled device 102 and/or the personal device 104, redacted text corresponding to the redacted text data may be displayed.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102 and/or the personal device 104.

FIG. 1 illustrates an example of the redaction operations described herein. An enlarged version of the personal device 104 is illustrated in FIG. 1, and a display 132 of the personal device 104 is caused to display information obtained, for example, using the activity-feed component 142. The information includes, in this example, an indication of a time of day and day of a given interaction with the voice-enabled device 102 and/or the personal device 104. Here, the day and time indication includes the display of text such as "Today at 7:43 pm." The information may also include an indication of a request that was received and/or processed at the indicated time and/or day. Here, the request indication includes the display of text such as "What's my account balance?" The information may also include an indication of a response that was provided in conjunction with the request. Here, the response indication includes the display of text such as "Your Bank A * account balance is $*." As shown in this example, the bank account number and the amount of money representing the account balance has been redacted such that the text does not include the bank account number or the amount of money, but instead includes asterisks representing the redacted portions. In this way, the sensitive information associated with the response is protected from dissemination other than when the response is presented to the user in conjunction with the request. Thereafter, the sensitive information may be removed from the remote system 106 and may be replaced with other information, here represented as redacted text data.

In examples, a sensitivity level associated with the designation data may inform the redaction process described above. For example, for a given sensitivity level designation, the responsive text data may be redacted as outlined herein. In other examples with a more sensitive designation, the responsive text data may be removed from the remote system 106 and may be replaced with text data indicating that the responsive text data is not available in light of its sensitivity. In these examples, when input data indicates a request to view the above-identified interaction with the voice-enabled device 102, the text data indicating that the responsive text data is not available may be displayed instead of the responsive text data. In this way, the user may see that an interaction occurred, but may not see what the interaction was.

Additionally, or alternatively, the third-party application 140 may provide designation data indicating that given requests and/or portions of requests are to be designated as sensitive. For example, a user utterance of "my personal identification number is 9999" includes sensitive information and may be designated as such by the third-party application 140. In these examples, the text data corresponding to this user utterance may be identified as sensitive and may be encrypted by the remote system 106, such as by the dispatcher 150, before being sent to the third-party application 140. This encryption may provide a level of protection to the sensitive information in the request while being transmitted between the dispatcher 150 and the third-party application 140. In these examples, the text data representing this request may be published to the data stores 160 in a redacted form and/or the text data may be deleted from the remote system 106 and replaced with text data indicating that the text representing the request is not available in light of its sensitivity.

As shown in FIG. 1, several of the components of the remote system 106 and the associated functionality of those components as described herein may be performed by one or more of the voice-enabled device 102 and/or the personal device 104. Additionally, or alternatively, some or all of the components and/or functionalities associated with the voice-enabled device 102 and/or the personal device 104 may be performed by the remote system 106.

It should be noted that the exchange of data and/or information as described herein may be performed only in situations where a user has provided consent for the exchange of such information. For example, upon setup of devices and/or initiation of applications and/or skills, a user may be provided with the opportunity to opt in and/or opt out of data exchanges between devices and/or with the remote system and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 110, 122, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 122, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 122, and/or the processor(s) described with respect to the components of the remote system 106 may possess its own local memory, which also may store program components, program data, and/or one or more operating systems.

The memory 114, 126, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 126, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 126, and/or the memory described with respect to the components of the remote system 106 may be implemented as computer-readable storage media ("CRSM"), which may be any available physical media accessible by the processor(s) 110, 122, and/or the processor(s) described with respect to the remote system 106 to execute instructions stored on the memory 114, 126, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 126, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 124, and/or the network interface(s) described with respect to the components of the remote system 106 may enable messages between the components and/or devices shown in system 100 and/or with one or more other remote systems, as well as other networked devices. Such network interface(s) 112, 124, and/or the network interface(s) described with respect to the components of the remote system 106 may include one or more network interface controllers (NICs) or other types of transceiver devices to send and receive messages over the network 108.

For instance, each of the network interface(s) 112, 124, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 124, and/or the network interface(s) described with respect to the components of the remote system 106 may include a wide area network (WAN) component to enable message over a wide area network.

In some instances, the remote system 106 may be local to an environment associated the voice-enabled device 102 and/or the personal device 104. For instance, the remote system 106 may be located within one or more of the voice-enabled device 102 and/or the personal device 104. In some instances, some or all of the functionality of the remote system 106 may be performed by one or more of the voice-enabled device 102 and/or the personal device 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
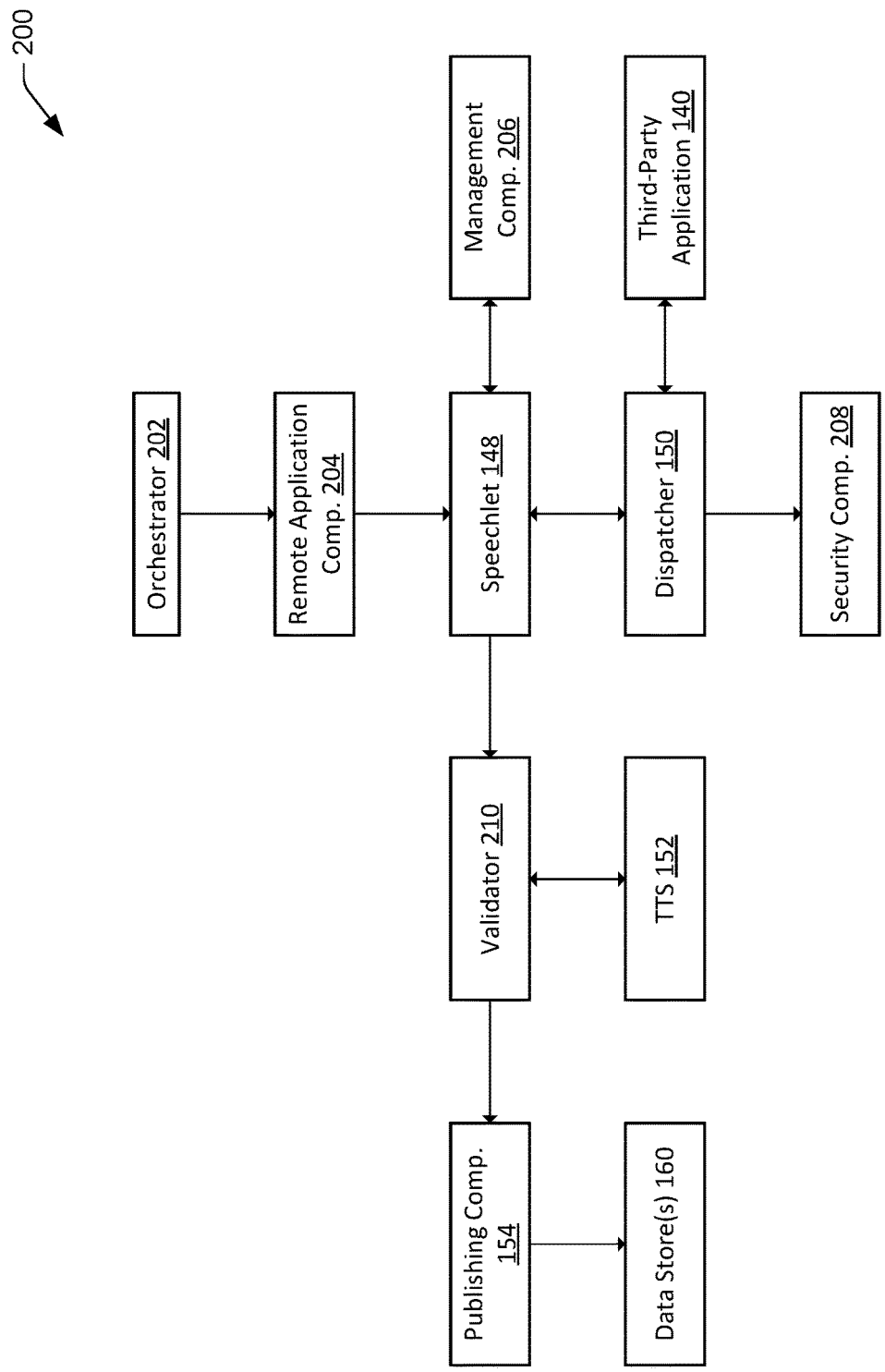
FIG. 2 illustrates a conceptual diagram of example components of a system for sensitive data management.

FIG. 2 illustrates a conceptual diagram of example components of a system 200 for sensitive data management. The system 200 may include at least some of the components described above with respect to FIG. 1. For example, the system 200 may include one or more speechlets 148, a dispatcher 150, a third-party application 140, a TTS component 152, a publishing component 154, and/or an activity-feed component 142. These components may include the same or similar functionality as the components described with respect to FIG. 1. Additionally, the system 200 may include an orchestrator 202, a remote application component 204, a management component 206, a security component 208, and/or a validator 210. Each of these components will be described below.

For example, the orchestrator 202 may be configured to receive intent data and/or other data and/or instructions from an NLU component. The orchestrator 202 may be configured to determine that the intent associated with the intent data corresponds to one or more speechlets, such as speechlet 148. In examples, where the identified speechlet 148 is a speechlet or is otherwise a speechlet associated with a third-party system and/or application, the orchestrator 202 may call the remote application component 204 to facilitate the transfer of data to the appropriate speechlet. Here, by way of example, the intent data may indicate that a user utterance corresponds to an intent for a third-party application to provide a response, such as a bank account balance and/or health-related information. The remote application component 204 may receive the data from the orchestrator 202 and may call the speechlet 148 to provide a response to the request corresponding to the user utterance.

For example, the speechlet 148 may be associated with a banking institution and/or a banking application and/or may have been developed by and/or in association with the banking institution. The speechlet 148 may be designated as being configured to handle the intent of identifying bank account balances, for example. The speechlet 148 may receive the intent data and/or other data associated with the user utterance from the remote application component 204 and may perform operations to instruct a device from which the request was received and/or another device to provide information associated with the request. In examples, the speechlet 148 may communicate with the management component 206, which may provide management functionality for the speechlet 148. For example, data infrastructures associated with the speechlet 148 and/or the operation of the speechlet 148 may be managed by the management component 206 to assist in reducing manual operation of the speechlet 148, such as by a developer of the speechlet 148. Functionalities associated with the management component 206 may include managing change requests, monitoring of activity by the speechlet 148, patch management, security operations, and/or backup functionalities, for example. The speechlet 148 may then provide the data or a portion thereof to the dispatcher 150 along with any data identified, determined, and/or generated by the speechlet 148 associated with the request.

The dispatcher 150 may receive the intent data and/or other data associated with the request from the speechlet 148. The dispatcher 150 may be configured to identify and/or determine that the speechlet 148 and/or the request is associated with the third-party application 140, and the dispatcher 150 may send the intent data and/or the other data to the third-party application 140. The data sent between the dispatcher 150 and the third-party application may be described as a response envelope and may include values for fields associated with the request and/or the third-party application 140. For example, the dispatcher 150 may identify and/or determine that the request is associated with a third-party application 140 for Bank A. The third-party application 140 may have been developed by and/or in association with Bank A and/or may have been designated as corresponding to operations associated with Bank A. It should be understood that while the third-party application 140 is depicted as a component of the system 200, the third-party application 140 may be a component of a third-party system.

The third-party application 140 may receive the intent data and/or other data from the dispatcher 150 and may be configured to generate text data representing a response to the request. For example, the third-party application 140 may analyze the intent data and/or the text data as sent by the dispatcher 150 and may generate responsive text data representing a response to the request. Using the example provided herein, the responsive text data may include "your Bank A account 1234 has a balance of $1,000" and/or "your doctor appointment at Hospital A is tomorrow at 9:00 am." The third-party application 140 may send this text data back to the dispatcher 150.

In addition to the responsive text data, the third-party application 140 may also identify, determine, and/or generate designation data and send that designation data to the dispatcher 150. For example, the designation data may indicate a portion of the responsive text data that is sensitive and should be treated with a degree of confidentiality and/or sensitivity. The designation data may be identified, determined, and/or generated by a SSML component of the third-party application 140 and may correspond to one or more SSML tags. The SSML tags may be identified, determined, and/or generated by the system 200 and may be made available to the third-party application 140 for sensitivity designation. The SSML tags may be associated with various sensitivity levels, which may be utilized to indicate how sensitive a particular portion of responsive text data is. The differing sensitivity level designations may be utilized by the system 200 to determine how to encrypt data, how to store data, and/or how to redact data associated with the responsive text data. In other examples, the SSML tags may be identified, determined, and/or generated by the third-party application 140 and may be provided to the system 200. As used herein, SSML may include a markup language that may provide a standard way to mark up text for the generation of synthetic speech and/or audio data. SSML is an XML-based markup language and may be embedded in voiceXML scripts to drive interactive telephony systems, when applicable.

The dispatcher 150, having received the responsive text data and the designation data, may then identify the portion of the responsive text data designated as sensitive. The responsive text data may be encrypted by the dispatcher 150 in examples where the designation data indicates that at least a portion of the text data is sensitive. In examples, the dispatcher 150 may send the encrypted text data and/or other associated data to the security component 208. The security component 208 may include functionality that enables application developers, such as a developer of the third-party application 140, to request and receive limited-privilege credentials for access management users and/or for authenticated users. The security component 208 may be utilized in instances where the third-party application 140 is being tested and/or developed and information associated with interactions between the dispatcher 150 and the third-party application 140 would be beneficial for testing and/or development.

The encrypted text data may then be sent back to the speechlet 148, which may send the encrypted text data to the validator 210, which may attempt to validate the text data as a response to the request. For example, the validator 210 may store reference data indicating acceptable text data and/or SSML data that may be received by other components to generate corresponding audio data. The validator 210 may utilize an SSML parser to parse the SSML data as applied to the text data. In instances where the validator 210 is able to validate the encrypted text data and/or the SSML data as received from the speechlet 148, the validator 210 may prompt the TTS component 152 to initiate generation of audio data. In examples, the validator 210 may utilize the data provided by the security component 208.

The TTS component 152 may then generate audio data that corresponds to the text data. In examples, the audio data may be encrypted based at least in part on the text data being encrypted and/or based at least in part on the designation data. The audio data may represent an audible response to the user utterance. In examples, the audio data may be generated by the TTS component 152 and/or a subcomponent thereof. In other examples, the TTS component 152 may be utilized to format the responsive text data and to send the text data to an external system, which may return the corresponding audio data. The audio data representing the response may be sent to the device from which the request was received for output of corresponding audio by speakers of the device. As such, the device may provide a response to the user utterance that audibly presents the sensitive information. In other examples, the audio data may be sent to a personal device. It should be understood that the TTS component 152 may utilize the data identified, determined, and/or generated by the security component 208.

Additionally, based at least in part on the response being designated as sensitive, once the audio data is sent to the device, the audio data may be removed from the system 200, such as by being deleted from memory associated with the system 200 and/or caches associated with the system 200. In this way, the audio data is maintained by the system 200 long enough to provide an audible response to the device, but then is removed to avoid long-term storage of the sensitive information associated with the response.

Additionally, the request text data, the responsive text data, and/or the audio data may be sent to the data stores 160 and may be accessible via the activity-feed component 142.

The activity-feed component 142 may be configured to utilize the request text data, the responsive text data, and/or the audio data such that a history of interactions with the device is available. This data may be stored in association with one or more data stores, such as the data stores 160 described with respect to FIG. 1. Generally, a user may access the data stored in association with the activity-feed component 142, such as using a personal device with access to an application associated with the system 200. The personal device may display a history of the interactions, which may include text representing requests, text representing responses to the requests, and/or options for outputting audio representing the requests and/or the responses. However, in examples where the response includes sensitive information, the publishing component 154 of the system 200, which may be configured to publish the text data and audio data to the data stores 160, may be configured to redact the text data and/or the audio data before publishing. For example, the designation data may be utilized to identify the portion of a given response that is sensitive. The publishing component 154 may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data. The redacted text data may be sent to and stored with respect to the data stores 160. In these examples, when user input indicates a request to view the above-identified interaction with the device 102 and/or the personal device 104, redacted text corresponding to the redacted text data may be displayed.

Additionally, or alternatively, the third-party application 140 may provide designation data indicating that given requests and/or portions of requests are to be designated as sensitive. For example, a user utterance of "my personal identification number is 9999" includes sensitive information and may be designated as such by the third-party application 140. In these examples, the text data corresponding to this user utterance may be identified as sensitive and may be encrypted by the system 200, such as by the dispatcher 150, before being sent to the third-party application 140. This encryption may provide a level of protection to the sensitive information in the request while being transmitted between the dispatcher 150 and the third-party application 140. In these examples, the text data representing this request may be published to the data stores 160 in a redacted form and/or the text data may be deleted from the system 200 and replaced with text data indicating that the text representing the request is not available in light of its sensitivity.

Figure 3:
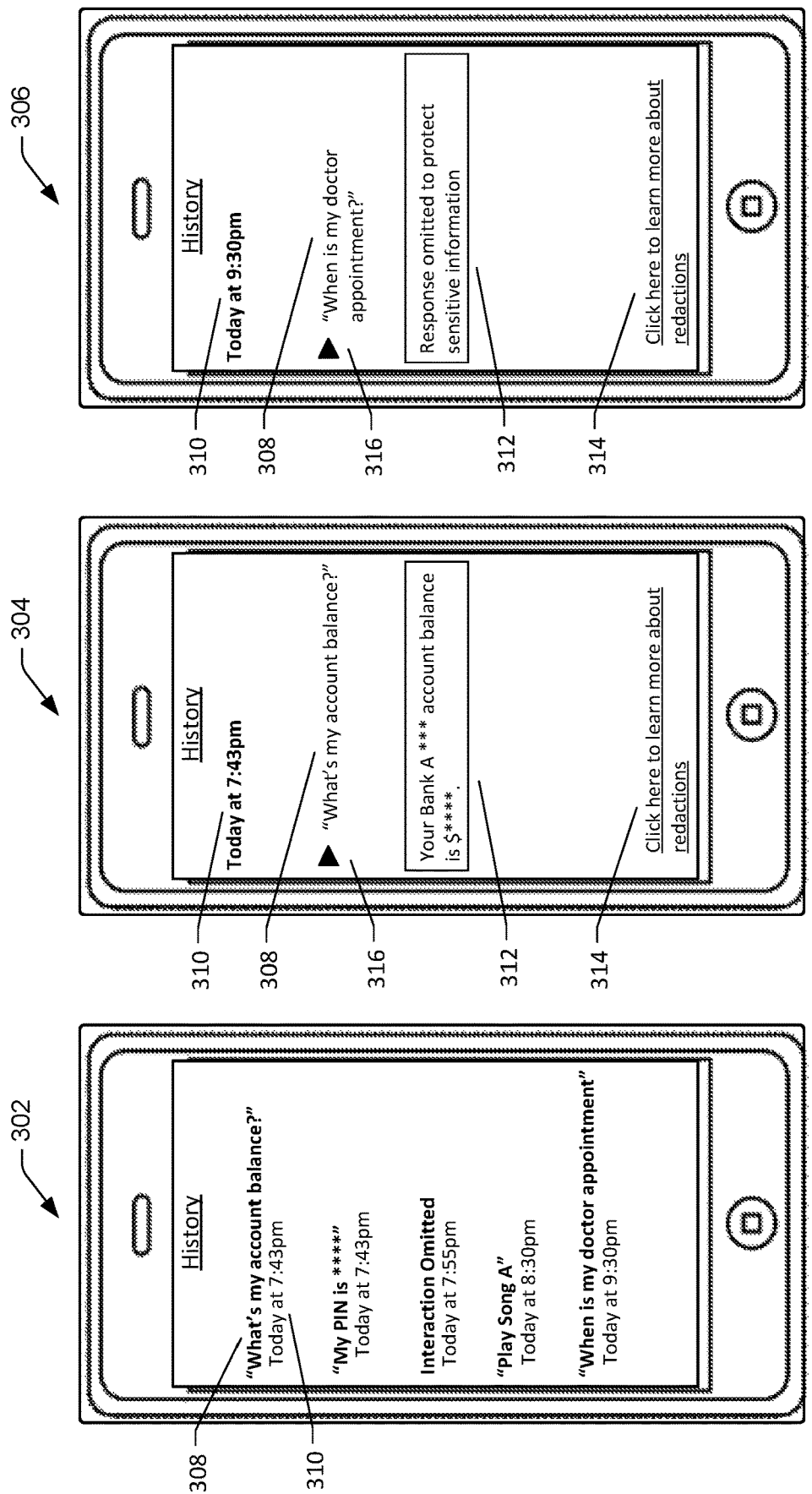
FIG. 3A illustrates an example user interface displaying activity-feed information in accordance with sensitive data management processes.
FIG. 3B illustrates another example user interface displaying activity-feed information in accordance with sensitive data management processes.
FIG. 3C illustrates another example user interface displaying activity-feed information in accordance with sensitive data management processes.

FIG. 3A illustrates an example user interface 302 displaying activity-feed information in accordance with sensitive data management processes. The user interface 302 may be displayed on a display of a personal device, such as the personal device 104 as described with respect to FIG. 1. For example, a user may desire to view a history of interactions associated with a given device, such as a given voice-enabled device. The user may access an application associated with the device and/or with a remote system associated with the device. The application may provide functionality such as, for example, an option to view event interaction history. The user may provide input to the personal device, such as selection of a portion of a screen associated with the option to view event interaction history, and corresponding input data may be utilized to cause event interaction information to be displayed.

For example, the input data may be utilized by the personal device and/or a remote system to request event interaction history, such as from an activity-feed component. The activity-feed component may store or cause to be stored past interactions with the voice-enabled device. For example, past requests, responses to the requests, actions performed, audio data associated with requests and/or responses, and/or timing designations associated with the interactions may be stored. For example, as shown with respect to FIG. 3A, text representing prior requests 308 may be caused to be displayed on a display of the personal device. Additionally, timing indicators 310 associated with the interactions may be caused to be displayed. For example, the requests 308 shown in FIG. 3A include textual representations of user utterances, such as "What's my account balance?," "My PIN is ****," "Interaction Omitted," "Play Song A," and "When is my doctor appointment." The timing indicators 310 include "Today at 7:43 pm," "Today at 7:43 pm," "Today at 7:55 pm," "Today at 8:30 pm," and "Today at 9:30 pm."

As shown in FIG. 3A, some of the requests 308, or portions thereof, have been redacted and/or omitted. For example, as described more fully herein, a third-party application may provide designation data indicating that given requests and/or portions of requests are to be designated as sensitive. For example, a user utterance of "my personal identification number is 9999" includes sensitive information and may be designated as such by the third-party application. In these examples, the text data corresponding to this user utterance may be identified as sensitive and may be encrypted, such as by a dispatcher, before being sent to the third-party application. This encryption may provide a level of protection to the sensitive information in the request while being transmitted between the dispatcher and the third-party application. In these examples, the text data representing this request may be published to an activity-feed component in a redacted form and/or the text data may be deleted from the system and replaced with text data indicating that the text representing the request is not available in light of its sensitivity.

Using FIG. 3A as an example, the first request 308, which includes "What's my account balance?" may not be designated as containing sensitive information. As such, the text data representing the request may be stored, such as in association with the activity-feed component, in an unredacted format. However, the second request 308, which includes "My PIN is 9999" contains information that may be designated as sensitive by the third-party application. For example, the third-party application may indicate that the value after "personal identifier number" and/or "PIN" text likely includes a PIN, and that PIN is to be designated as sensitive. The remote system may utilize this designation data from the third-party application to identify the "9999" as a sensitive portion of the second request 308. The sensitive portion may be redacted such that the "9999" may be replaced with asterisks or other redacted formats. By way of continued example, the third request 310, which includes "Interaction Omitted" may be designated as containing sensitive information. In these example, instead of a portion of the request being redacted, the entire request has been removed and replaced by text indicating that the interaction has been omitted. In examples, removing and replacing a request may be performed when the request is or includes information that has been designated with a sensitivity level that is more sensitive than a sensitivity level associated with the second request 308. In other words, a first sensitivity level may correspond to sensitive portions of a request being redacted while other portions of the request remain. A second sensitivity level may correspond to the entire request being redacted or otherwise removed and replacement text indicating omission of the interaction being stored and/or displayed instead. Although not depicted in FIG. 3A, the timing indicators 310 may also be redacted and/or removed from a given request based at least in part on the sensitivity designations.

FIG. 3B illustrates another example user interface 304 displaying activity-feed information in accordance with sensitive data management processes. The user interface 304 may be displayed on a display of a personal device, such as the personal device 104 as described with respect to FIG. 1. For example, a user may desire to view a history of interactions associated with a given device, such as a given voice-enabled device. The user may access an application associated with the device and/or with a remote system associated with the device. The application may provide functionality such as, for example, an option to view event interaction history. The user may provide input to the personal device, such as selection of a portion of a screen associated with the option to view event interaction history, and corresponding input data may be utilized to cause event interaction information to be displayed.

For example, the input data may be utilized by the personal device and/or a remote system to request event interaction history, such as from an activity-feed component. The activity-feed component may store or cause to be stored past interactions with the voice-enabled device. For example, past requests, responses to the requests, actions performed, audio data associated with requests and/or responses, and/or timing designations associated with the interactions may be stored. For example, as shown with respect to FIG. 3B, a user may provide input indicating selection of a prior request 308, which may be caused to be displayed on a display of the personal device additional information associated with the request 308. For example, a timing indicator 310 associated with the request 308 may be caused to be displayed. Additionally, text representing a response 312 to the request 308 may be caused to be displayed. For example, the request 308 shown in FIG. 3B include a textual representation of a user utterance, such as "What's my account balance?" The timing indicator 310 may include "Today at 7:43 pm."

As shown in FIG. 3B, a portion of the response 312 been redacted and/or omitted. For example, as described more fully herein, a third-party application may provide designation data indicating that given responses and/or portions of responses are to be designated as sensitive. For example, a response including "Your Bank A 123 account balance is $1,000" includes sensitive information such as a bank account number and a monetary amount associated with the bank account. These portions of the response may be designated as sensitive by the third-party application. In these examples, the text data corresponding to this response may be identified as sensitive and may be encrypted, such as by a dispatcher, before being sent to other components of the remote system. In these examples, the text data representing this response 312 may be published to an activity-feed component in a redacted form and/or the text data may be deleted from the system and replaced with text data indicating that the text representing the request is not available in light of its sensitivity.

As such, while the full response 312 including the sensitive information may have been presented in response to the request 308 at the time of the request 308, the event history associated with the request 308 may be redacted, particularly including redaction of the response 312, to avoid the sensitive portions from being stored by the system after the interaction and/or to avoid the sensitive portions from being accessed and/or viewed after the interaction.

Additionally, or alternatively, a link 314 or other information access point may be displayed on the display of the personal device. Input data indicating selection of the link 314 may cause additional information associated with the interaction to be displayed, such as information indicating why the response 312 was redacted. Additionally, or alternatively, a play icon 316 may be displayed and may, when selected, cause audio representing the request 308 and/or the response 312 to be output, such as by speakers associated with the personal device. In examples where the request 308 has been redacted, the audio may reflect the redactions such that the redacted portions of the textual representation are also omitted from the audio data. In other examples where the request 308 has been omitted, the audio may reflect the omission such that the audio data represents an indication that the audio cannot be output in light of the sensitivity designation. Additionally, or alternatively, in examples where the response 312 has been redacted, the audio may reflect the redactions such that the redacted portions of the textual representation are also omitted from the audio data. In other examples where the response 312 has been omitted, the audio may reflect the omission such that the audio data represents an indication that the audio cannot be output in light of the sensitivity designation.

FIG. 3C illustrates another example user interface 306 displaying activity-feed information in accordance with sensitive data management processes. The user interface 306 may be displayed on a display of a personal device, such as the personal device 104 as described with respect to FIG. 1. For example, a user may desire to view a history of interactions associated with a given device, such as a given voice-enabled device. The user may access an application associated with the device and/or with a remote system associated with the device. The application may provide functionality such as, for example, an option to view event interaction history. The user may provide input to the personal device, such as selection of a portion of a screen associated with the option to view event interaction history, and corresponding input data may be utilized to cause event interaction information to be displayed.

For example, the input data may be utilized by the personal device and/or a remote system to request event interaction history, such as from an activity-feed component. The activity-feed component may store or cause to be stored past interactions with the voice-enabled device. For example, past requests, responses to the requests, actions performed, audio data associated with requests and/or responses, and/or timing designations associated with the interactions may be stored. For example, as shown with respect to FIG. 3C, a user may provide input indicating selection of a prior request 308, which may be caused to be displayed on a display of the personal device additional information associated with the request 308. For example, a timing indicator 310 associated with the request 308 may be caused to be displayed. Additionally, text representing a response 312 to the request 308 may be caused to be displayed. For example, the request 308 shown in FIG. 3C include a textual representation of a user utterance, such as "When is my doctor appointment?" The timing indicator 310 may include "Today at 9:30 pm."

As shown in FIG. 3C, the entire response 312 been redacted and/or omitted. For example, as described more fully herein, a third-party application may provide designation data indicating that given responses is to be designated as sensitive. For example, a response including "Your radiology appointment at Hospital A is tomorrow at 10:00 am" includes also entirely sensitive information such as the type of health-related appointment, a location of the appointment, a date of the appointment, and a time of day of the appointment. A response 312 such as this may be designated as sensitive by the third-party application. In these examples, the text data corresponding to this response may be identified as sensitive and may be encrypted, such as by a dispatcher, before being sent to other components of the remote system. In these examples, the text data may be deleted from the system once the interaction concludes and may be replaced with text data indicating that the text representing the request is not available in light of its sensitivity. As shown in FIG. 3C, the replacement text may be "Response omitted to protect sensitive information."

As such, while the full response 312 including the sensitive information may have been presented in response to the request 308 at the time of the request 308, the event history associated with the request 308 may be redacted and/or omitted and replaced to avoid the sensitive portions from being stored by the system after the interaction and/or to avoid the sensitive portions from being accessed and/or viewed after the interaction.

Additionally, or alternatively, a link 314 or other information access point may be displayed on the display of the personal device. Input data indicating selection of the link 314 may cause additional information associated with the interaction to be displayed, such as information indicating why the response 312 was redacted. Additionally, or alternatively, a play icon 316 may be displayed and may, when selected, cause audio representing the request 308 and/or the response 312 to be output, such as by speakers associated with the personal device. In examples where the request 308 has been redacted, the audio may reflect the redactions such that the redacted portions of the textual representation are also omitted from the audio data. In other examples where the request 308 has been omitted, the audio may reflect the omission such that the audio data represents an indication that the audio cannot be output in light of the sensitivity designation. Additionally, or alternatively, in examples where the response 312 has been redacted, the audio may reflect the redactions such that the redacted portions of the textual representation are also omitted from the audio data. In other examples where the response 312 has been omitted, the audio may reflect the omission such that the audio data represents an indication that the audio cannot be output in light of the sensitivity designation.

FIGS. 4-7 illustrate processes for sensitive data management. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, 8, and 9, although the processes may be implemented in a wide variety of other environments, architectures and systems.

Figure 4:
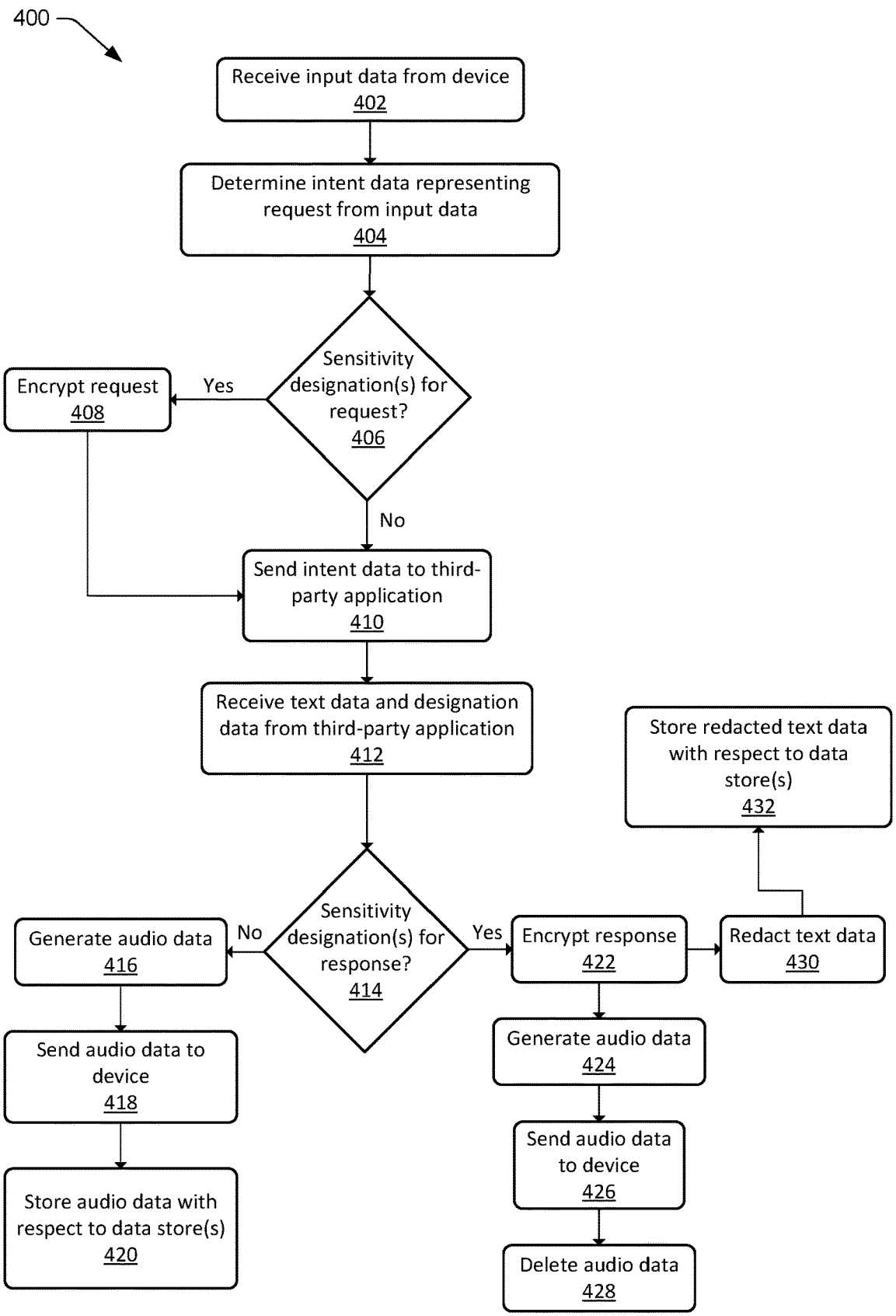
FIG. 4 illustrates a flow diagram of an example process for sensitive data management.

FIG. 4 illustrates a flow diagram of an example process 400 for sensitive data management. The order in which the operations or steps are described is not intended to be construed as a limitation, and any number of the described operations may be combined in any order and/or in parallel to implement process 400.

At block 402, the process 400 may include receiving input data from a device. For example, the input data may include audio data received from the device. In these examples, the audio data may represent a user utterance captured by microphones of the device. The device, for example, may include a voice-enabled device as described herein. In other examples, the input data may represent user input to a personal device.

At block 404, the process 400 may include determining intent data representing a request from the input data. For example, when the input data is audio data, an ASR component may be utilized to generate corresponding text data representing the user utterance. An NLU component may be utilized to generate the intent data based at least in part on the audio data. ASR and NLU techniques are described in more detail below with respect to FIG. 8.

At block 406, the process 400 may include determining whether one or more sensitivity designations have been received and/or are associated with the request. For example, a third-party application may provide designation data indicating that given requests and/or portions of requests are to be designated as sensitive. For example, a user utterance of "my personal identification number is 9999" includes sensitive information and may be designated as such by the third-party application.

If one or more sensitivity designations were received and/or are associated with the request, the process 400 may include, at block 408, encrypting the request. In these examples, the text data corresponding to the user utterance may be identified as sensitive and may be encrypted by the remote system before being sent to the third-party application. This encryption may provide a level of protection to the sensitive information in the request while being transmitted between the remote system and the third-party application. In these examples, the text data representing this request may be published to an activity-feed component in a redacted form and/or the text data may be deleted from the remote system and replaced with text data indicating that the text representing the request is not available in light of its sensitivity.

If one or more sensitivity designations were not received and/or are not associated with the request, or following encryption of the text data representing the request at block 408, the process 400 may include, at block 410, sending the intent data and/or other data associated with the request to a third-party application. For example, the intent data may indicate a determined intent associated with the user utterance as well as a payload and/or value associated with the intent. For example, for a user utterance of "what's the balance of my Bank A account," the NLU component may identify a "bank account balance" intent and the payload may be "Bank A." In this example where the intent data indicates an intent to receive information indicating an amount of money associated with a given account for Bank A, the remote system may call one or more speechlets to effectuate the intent. For example, a speechlet may be associated with Bank A and/or may have been developed by and/or in association with Bank A. The speechlet may be designated as being configured to handle the intent of identifying bank account balances, for example. The speechlet may receive the intent data and/or other data associated with the user utterance from the NLU component, such as by an orchestrator and/or a remote application component of the remote system, and may perform operations to instruct the device from which the input data was received and/or another device to provide information associated with the request.

A dispatcher may receive the intent data and/or other data associated with the request from the speechlet. The dispatcher may be configured to identify and/or determine that the speechlet and/or the request is associated with the third-party application, and the dispatcher may send the intent data and/or the other data to the third-party application. For example, the dispatcher may identify and/or determine that the request is associated with a third-party application for Bank A. The third-party application may have been developed by and/or in association with Bank A and/or may have been designated as corresponding to operations associated with Bank A.

At block 412, the process 400 may include receiving text data and designation data from the third-party application. For example, the third-party application may receive the intent data and/or other data from the dispatcher and may be configured to generate text data representing a response to the request. For example, the third-party application may analyze the intent data and/or the text data as sent by the dispatcher and may generate responsive text data representing a response to the request. Using the example provided herein, the responsive text data may include "your Bank A account 1234 has a balance of $1,000" and/or "your doctor appointment at Hospital A is tomorrow at 9:00 am." The third-party application may send this text data back to the speechlet and/or to the dispatcher.

In addition to the responsive text data, the third-party application may also identify, determine, and/or generate designation data and send that designation data to the speechlet and/or the dispatcher. For example, the designation data may indicate a portion of the responsive text data that is sensitive and should be treated with a degree of confidentiality and/or sensitivity. The designation data may be identified, determined, and/or generated by a SSML component and may correspond to one or more SSML tags. The SSML tags may be identified, determined, and/or generated by the remote system and may be made available to the third-party application for sensitivity designation. The SSML tags may be associated with various sensitivity levels, which may be utilized to indicate how sensitive a particular portion of responsive text data is. The differing sensitivity level designations may be utilized by the remote system to determine how to encrypt data, how to store data, and/or how to redact data associated with the responsive text data. In other examples, the SSML tags may be identified, determined, and/or generated by the third-party application and may be provided to the remote system.

At block 414, the process 400 may include determining whether one or more sensitivity designations were received and/or are associated with the response. For example, the dispatcher, having received the responsive text data and the designation data, may then identify the portion of the responsive text data designated as sensitive. If no designation data was received and/or designation data was received designating the responsive text as not sensitive, then sensitivity designations will be determined to have not been received. If one or more sensitivity designations were not received and/or are not associated with the response, the process 400 may continue to block 416, where audio data corresponding to the response may be generated. For example, a TTS component may then generate audio data that corresponds to the responsive text data. The audio data may represent an audible response to the user utterance. In examples, the audio data may be generated by the TTS component and/or a subcomponent thereof. In other examples, the TTS component may be utilized to format the responsive text data and to send the text data to an external system, which may return the corresponding audio data.

At block 418, the process 400 may include sending the audio data to a device for output of corresponding audio by a speaker of the device. For example, the audio data representing the response may be sent to the device for output of corresponding audio by one or more of speakers of the device. As such, the device may provide a response to the user utterance that audibly presents the sensitive information. In other examples, the audio data may be sent to a personal device. In other examples, the response may be presented on displays of the device and/or on displays of the personal device. In these examples, instead of or in addition to audio data, the remote system may send text data to be utilized to present text representing the response. The text may be caused to be displayed for a predetermined amount of time in instances where the response includes sensitive information.

At block 420, the process 400 may include storing the audio data with respect to a data store. For example, the request text data, the responsive text data, and/or the audio data may be sent to the data store. The data store may be configured to store the request text data, the responsive text data, and/or the audio data such that a history of interactions with the device is maintained. Generally, a user may access the data stored in association with the activity-feed component, such as using the personal device. The personal device may display a history of the interactions, which may include text representing requests, text representing responses to the requests, and/or options for outputting audio representing the requests and/or the responses. In this example where sensitivity designations were not determined for the responsive text data, the responsive text data may be stored in association with the activity-feed component in an unredacted form.

Returning to block 414, if one or more sensitivity designations are received and/or are associated with the response, the process 400 may continue to block 422, where the text data associated with the response may be encrypted. For example, the dispatcher, having received the responsive text data and the designation data, may then identify the portion of the responsive text data designated as sensitive. The responsive text data may be encrypted by the dispatcher in examples where the designation data indicates that at least a portion of the text data is sensitive. The encrypted text data may be sent to a validation component, which may attempt to validate the text data as a response to the request.

At block 424, the process 400 may include generating audio data corresponding to the response. The audio data may be generated in the same or a similar manner as described with respect to block 416. However, in these examples, the audio data may be encrypted based at least in part on the text data being encrypted and/or based at least in part on the designation data.

At block 426, the process 400 may include sending the audio data to a device for output of corresponding audio by a speaker of the device. Sending the audio data may be performed in the same or a similar manner as sending the audio data with respect to block 418.

At block 428, the process 400 may include deleting or otherwise removing the audio data. For example, based at least in part on the response being designated as sensitive, once the audio data is sent to the device, the audio data may be removed from the remote system, such as by being deleted from memory associated with the remote system and/or caches associated with the remote system. In this way, the audio data is maintained by the remote system long enough to provide an audible response to the device, but then is removed to avoid long-term storage of the sensitive information associated with the response.

Returning to block 422, once the text data representing the response is encrypted, in examples, at block 430, the text data may be redacted such that the portions designated as sensitive are deleted and/or removed and are replaced with a redacted format. For example, where the response includes sensitive information, a publishing component, which may be configured to publish the text data and audio data to the activity-feed component, may be configured to redact the text data and/or the audio data before publishing. For example, the designation data may be utilized to identify the portion of a given response that is sensitive. The publishing component may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data.

At block 432, the process 400 may include storing redacted text data with respect to the data store. For example, the redacted text data may be sent to and stored with respect to the data store. In these examples, when user input indicates a request to view the above-identified interaction with the device, redacted text corresponding to the redacted text data may be displayed.

Figure 5:
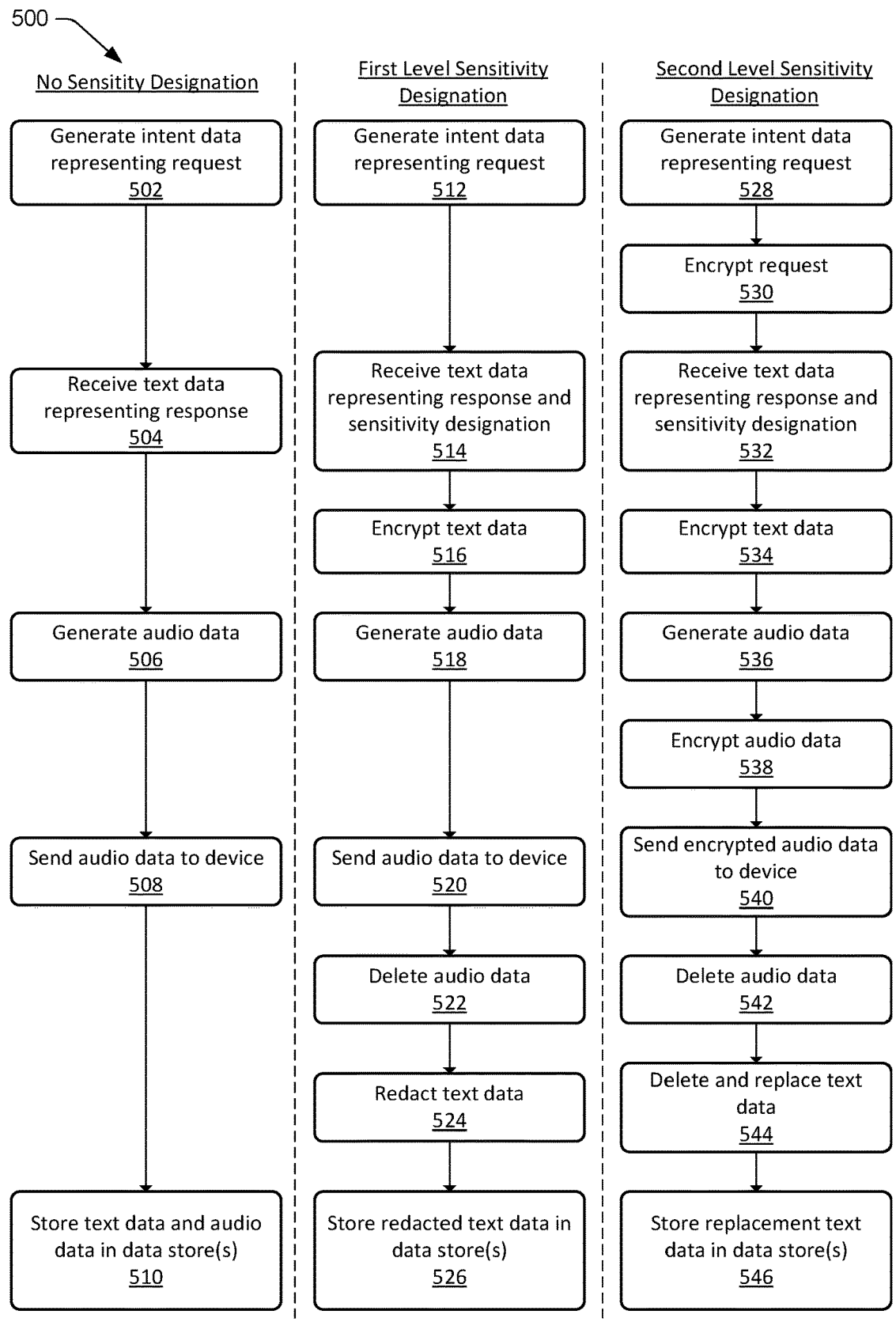
FIG. 5 illustrates a flow diagram of example processes for managing sensitive data based at least in part on one or more sensitivity designations.

FIG. 5 illustrates a flow diagram of example processes 500 for managing sensitive data based at least in part on one or more sensitivity designations. The order in which the operations or steps are described is not intended to be construed as a limitation, and any number of the described operations may be combined in any order and/or in parallel to implement process 500. As shown with respect to FIG. 5, one or more sensitivity designations and/or sensitivity designation levels may be associated with a given request and/or a given response. The sensitivity designation levels may be provided by a third-party application servicing a request. Depending on the sensitivity designation level, the operations and generated data may differ as described herein with respect to FIG. 5.

For example, audio data representing a user utterance may be received by a remote system and ASR and/or NLU techniques as described more fully herein may be utilized for speech processing. When no sensitivity designation is received and/or associated with a given request and/or response, the process 500, at block 502, may include generating intent data representing a request corresponding to the user utterance. For example, an ASR component may be utilized to generate text data representing the user utterance. An NLU component may be utilized to generate the intent data based at least in part on the audio data. ASR and NLU techniques are described in more detail below with respect to FIG. 8.

At block 504, the process 500 may include receiving text data representing a response from the third-party application. For example, the third-party application may receive the intent data and/or other data from a dispatcher and may be configured to generate text data representing a response to the request. For example, the third-party application may analyze the intent data and/or the text data as sent by the dispatcher and may generate responsive text data representing a response to the request. Using the example provided herein, the responsive text data may include "your Bank A account 1234 has a balance of $1,000" and/or "your doctor appointment at Hospital A is tomorrow at 9:00 am." The third-party application may send this text data back to the speechlet and/or to the dispatcher. In these examples where there is no sensitivity designation, designation data may not be received from the third-party application and/or the designation data received from the third-party application may indicate that there is no sensitivity designation.

At block 506, the process 500 may include generating audio data corresponding to the responsive text data. For example, a TTS component may then generate audio data that corresponds to the responsive text data. The audio data may represent an audible response to the user utterance. In examples, the audio data may be generated by the TTS component and/or a subcomponent thereof. In other examples, the TTS component may be utilized to format the responsive text data and to send the text data to an external system, which may return the corresponding audio data.

At block 508, the process 500 may include sending the audio data to the device. For example, the audio data representing the response may be sent to the device for output of corresponding audio by one or more of speakers of the device. As such, the device may provide a response to the user utterance that audibly presents the sensitive information. In other examples, the audio data may be sent to a personal device. In other examples, the response may be presented on displays of the device and/or on displays of the personal device. In these examples, instead of or in addition to audio data, the remote system may send text data to be utilized to present text representing the response. The text may be caused to be displayed for a predetermined amount of time in instances where the response includes sensitive information.

At block 510, the process 500 may include storing the text data and/or the audio data in association with a data store. For example, the request text data, the responsive text data, and/or the audio data may be sent to the data store. The activity-feed component may be configured to utilize the request text data, the responsive text data, and/or the audio data such that a history of interactions with the device is maintained. Generally, a user may access the data stored in association with the data store, such as using the personal device. The personal device may display a history of the interactions, which may include text representing requests, text representing responses to the requests, and/or options for outputting audio representing the requests and/or the responses. In this example where sensitivity designations were not determined for the responsive text data, the responsive text data may be stored in association with the data store in an unredacted form.

In other examples where a sensitivity designation is received with respect to a given request and/or a given response, the sensitivity designation may indicate a first sensitivity level, which may correspond to information that is sensitive but less sensitive than a second sensitivity level. In these examples, the process 500, at block 512, may include generating intent data representing the request. Generating the intent data may be performed in the same or a similar manner as described with respect to block 502.

At block 514, the process 500 may include receiving responsive text data representing a response to the request and designation data indicating the text data includes information with the first sensitivity level designation. Receiving the responsive text data may be performed in the same or a similar manner as described with respect to block 504. Additionally, the third-party application may identify, determine, and/or generate designation data and send that designation data to the speechlet and/or the dispatcher. For example, the designation data may indicate a portion of the responsive text data that is sensitive and should be treated with a degree of confidentiality and/or sensitivity. The designation data may be identified, determined, and/or generated by a SSML component and may correspond to one or more SSML tags. The SSML tags may be identified, determined, and/or generated by the remote system and may be made available to the third-party application for sensitivity designation.

At block 516, the process 500 may include encrypting the text data. For example, the dispatcher, having received the responsive text data and the designation data, may then identify the portion of the responsive text data designated as sensitive. The responsive text data may be encrypted by the dispatcher in examples where the designation data indicates that at least a portion of the text data is sensitive. The encrypted text data may be sent to a validation component, which may attempt to validate the text data as a response to the request.

At block 518, the process 500 may include generating audio data corresponding to the encrypted text data. The audio data may be generated in the same or a similar manner as described with respect to block 508. However, in these examples, the audio data may be encrypted based at least in part on the text data being encrypted and/or based at least in part on the designation data.

At block 520, the process 500 may include sending the audio data to a device for output of corresponding audio by a speaker of the device. Sending the audio data may be performed in the same or a similar manner as sending the audio data with respect to block 510.

At block 522, the process 500 may include deleting and/or otherwise removing the audio data from memory associated with the system. For example, based at least in part on the response being designated as sensitive, once the audio data is sent to the device, the audio data may be removed from the remote system, such as by being deleted from memory associated with the remote system and/or caches associated with the remote system. In this way, the audio data is maintained by the remote system long enough to provide an audible response to the device, but then is removed to avoid long-term storage of the sensitive information associated with the response.

At block 524, the process 500 may include redacting at least the portion(s) of the text data indicated to be sensitive. For example, where the response includes sensitive information, a publishing component, which may be configured to publish the text data and audio data to the activity-feed component, may be configured to redact the text data and/or the audio data before publishing. For example, the designation data may be utilized to identify the portion of a given response that is sensitive. The publishing component may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data.

At block 526, the process 500 may include storing redacted text data in association with the data store. For example, the redacted text data may be sent to and stored with respect to the data store. In these examples, when user input indicates a request to view the above-identified interaction with the device, redacted text corresponding to the redacted text data may be displayed.

In other examples where a sensitivity designation is received with respect to a given request and/or a given response, the sensitivity designation may indicate a second sensitivity level, which may correspond to information that is more sensitive than the first sensitivity level. In these examples, the process 500, at block 528, may include generating intent data representing the request. Generating the intent data may be performed in the same or a similar manner as described with respect to block 502.

At block 530, the process 500 may include encrypting the request. In these examples, the text data corresponding to the user utterance may be identified as sensitive and may be encrypted by the remote system before being sent to the third-party application. This encryption may provide a level of protection to the sensitive information in the request while being transmitted between the remote system and the third-party application. In these examples, the text data representing this request may be published to an activity-feed component in a redacted form and/or the text data may be deleted from the remote system and replaced with text data indicating that the text representing the request is not available in light of its sensitivity.

At block 532, the process 500 may include receiving text data representing a response and a sensitivity designation associated with the response. Receiving the text data and the sensitivity designation may be performed in the same or a similar manner as described with respect to block 514.

At block 534, the process 500 may include encrypting the responsive text data. Encrypting the responsive text data may be performed in the same or a similar manner as described with respect to block 516. However, in examples where the second level sensitivity designation is used, the encryption type utilized at block 534 may differ from the encryption type utilized at block 516. For example, for highly sensitive information a more robust encryption type may be utilized.

At block 536, the process 500 may include generating audio data corresponding to the responsive text data. Generating the audio data may be performed in the same or a similar manner as described with respect to block 518.

At block 538, the process 500 may include encrypting the audio data. For example, given the second level sensitivity designation, the audio data may be encrypted and/or the encryption may be more robust than general encryption performed on the audio data.

At block 540, the process 500 may include sending the encrypted audio data to the device. Sending the audio data may be performed in the same or a similar manner as described with respect to block 520.

At block 542, the process 500 may include deleting and/or otherwise removing the audio data from the system. Deleting the audio data may be performed in the same or a similar manner as described with respect to block 522.

At block 544, the process 500 may include deleting and replacing the responsive text data with text data indicating that the response has been omitted and/or removed in light of the sensitivity designation. For example, where the response includes sensitive information, a publishing component, which may be configured to publish the text data and audio data to the activity-feed component, may be configured to redact the text data and/or the audio data before publishing. For example, the designation data may indicate that the entire responsive text data is to be redacted or otherwise deleted. The publishing component may then replace the responsive text data with other text data indicating that the responsive text data has been omitted in light of the sensitivity designation.

At block 546, the process 500 may include storing replacement text indicating that the response has been omitted and/or removed in association with the data store. For example, the replacement text data may be sent to and stored with respect to the data store. In these examples, when user input indicates a request to view the above-identified interaction with the device, replacement text corresponding to the replacement text data may be displayed.

Figure 6:
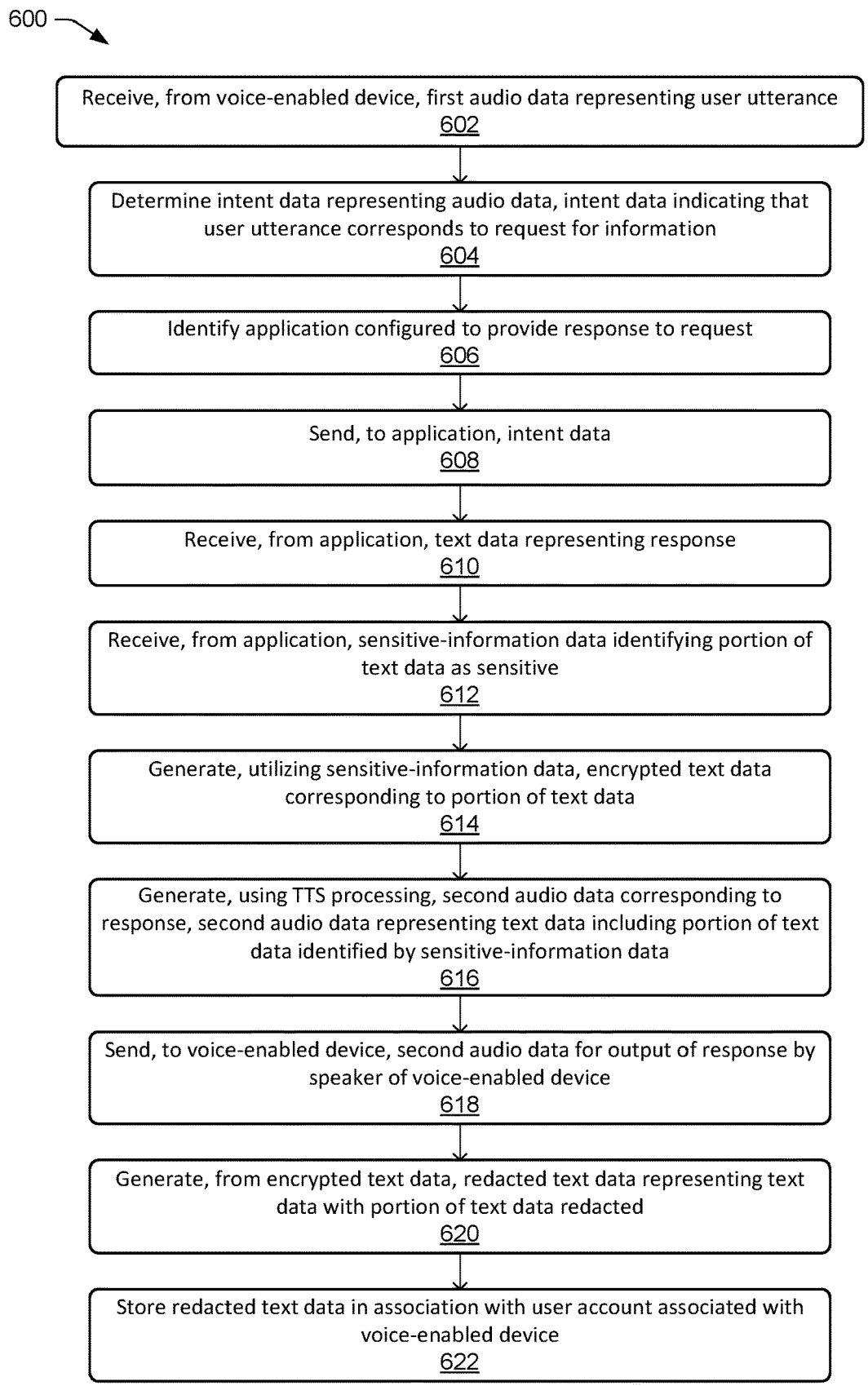
FIG. 6 illustrates a flow diagram of an example process for sensitive data management.

FIG. 6 illustrates a flow diagram of an example process 600 for sensitive data management. The order in which the operations or steps are described is not intended to be construed as a limitation, and any number of the described operations may be combined in any order and/or in parallel to implement process 600.

At block 602, the process 600 may include receiving, from a voice-enabled device, first audio data representing a user utterance. In these examples, the audio data may represent a user utterance captured by microphones of the device. The microphones may generate the audio data and send the audio data to a remote system for speech processing.

At block 604, the process 600 may include determining intent data representing the audio data, the intent data indicating that the user utterance corresponds to a request for information. For example, an ASR component may be utilized to generate corresponding text data representing the user utterance. An NLU component may be utilized to generate the intent data based at least in part on the audio data. In other examples, the remote system may generate and/or determine the intent data from the audio data without generating and/or utilizing text data. ASR and NLU techniques are described in more detail below with respect to FIG. 8.

At block 606, the process 600 may include identifying an application configured to provide a response to the request. For example, the intent data may indicate a determined intent associated with the user utterance as well as a payload and/or value associated with the intent. For example, for a user utterance of "what's the balance of my Bank A account," the NLU component may identify a "bank account balance" intent and the payload may be "Bank A." In this example where the intent data indicates an intent to receive information indicating an amount of money associated with a given account for Bank A, the remote system may call one or more speechlets to effectuate the intent. For example, a speechlet may be associated with Bank A and/or may have been developed by and/or in association with Bank A. The speechlet may be designated as being configured to handle the intent of identifying bank account balances, for example. The speechlet may receive the intent data and/or other data associated with the user utterance from the NLU component, such as by an orchestrator and/or a remote application component of the remote system, and may perform operations to instruct the device from which the input data was received and/or another device to provide information associated with the request. A dispatcher may receive the intent data and/or other data associated with the request from the speechlet.

At block 608, the process 600 may include sending, to the application, at least a portion of the intent data. For example, the dispatcher may be configured to identify and/or determine that the speechlet and/or the request is associated with the third-party application, and the dispatcher may send the intent data and/or the other data to the third-party application. For example, the dispatcher may identify and/or determine that the request is associated with a third-party application for Bank A. The third-party application may have been developed by and/or in association with Bank A and/or may have been designated as corresponding to operations associated with Bank A.

At block 610, the process 600 may include receiving, from the application, text data representing the response. For example, the application may receive the intent data and/or other data from the dispatcher and may be configured to generate text data representing a response to the request. For example, the application may analyze the intent data and/or the text data as sent by the dispatcher and may generate responsive text data representing a response to the request. Using the example provided herein, the responsive text data may include "your Bank A account 1234 has a balance of $1,000" and/or "your doctor appointment at Hospital A is tomorrow at 9:00 am." The application may send this text data back to the speechlet and/or to the dispatcher.

At block 612, the process 600 may include receiving, from the application, sensitive-information data identifying a portion of the text data as sensitive. For example, the application may identify, determine, and/or generate sensitive-information data, also described herein as designation data, and send that designation data to the speechlet and/or the dispatcher. For example, the designation data may indicate a portion of the responsive text data that is sensitive and should be treated with a degree of confidentiality and/or sensitivity. The designation data may be identified, determined, and/or generated by a SSML component and may correspond to one or more SSML tags. The SSML tags may be identified, determined, and/or generated by the remote system and may be made available to the application for sensitivity designation. The SSML tags may be associated with various sensitivity levels, which may be utilized to indicate how sensitive a particular portion of responsive text data is. The differing sensitivity level designations may be utilized by the remote system to determine how to encrypt data, how to store data, and/or how to redact data associated with the responsive text data. In other examples, the SSML tags may be identified, determined, and/or generated by the application and may be provided to the remote system.

At block 614, the process 600 may include generating, utilizing the sensitive-information data, encrypted text data corresponding to at least the portion of the text data. For example, the dispatcher, having received the responsive text data and the sensitive-information data, may then identify the portion of the responsive text data designated as sensitive. The responsive text data may be encrypted by the dispatcher in examples where the designation data indicates that at least a portion of the text data is sensitive. The encrypted text data may be sent to a validation component, which may attempt to validate the text data as a response to the request.

At block 616, the process 600 may include generating, using text to speech (TTS) processing, second audio data corresponding to the response, the second audio data representing the text data including the portion of the text data identified by the sensitive-information data. For example, a TTS component may then generate audio data that corresponds to the encrypted text data. The audio data may represent an audible response to the user utterance. In examples, the audio data may be generated by the TTS component and/or a subcomponent thereof. In other examples, the TTS component may be utilized to format the responsive text data and to send the text data to an external system, which may return the corresponding audio data.

At block 618, the process 600 may include sending, to the voice-enabled device, the second audio data for output of the response by a speaker of the voice-enabled device. For example, the audio data representing the response may be sent to the voice-enabled device for output of corresponding audio by one or more of speakers of the device. As such, the device may provide a response to the user utterance that audibly presents the sensitive information. In other examples, the audio data may be sent to a personal device. In other examples, the response may be presented on displays of the device and/or on displays of the personal device. In these examples, instead of or in addition to audio data, the remote system may send text data to be utilized to present text representing the response. The text may be caused to be displayed for a predetermined amount of time in instances where the response includes sensitive information.

At block 620, the process 600 may include, generating, from the encrypted text data, redacted text data representing the text data with the portion of the text data redacted. For example, where the response includes sensitive information, a publishing component, which may be configured to publish the text data and audio data to the activity-feed component, may be configured to redact the text data and/or the audio data before publishing. For example, the designation data may be utilized to identify the portion of a given response that is sensitive. The publishing component may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data.

At block 622, the process 600 may include storing the redacted text data in association with a user account associated with the voice-enabled device. For example, the redacted text data may be sent to and stored with respect to the activity-feed component. In these examples, when user input indicates a request to view the above-identified interaction with the device, redacted text corresponding to the redacted text data may be displayed.

Additionally, or alternatively, the process 600 may include, in response to sending the second audio data, causing the second audio data to be removed from the system. For example, based at least in part on the response being designated as sensitive, once the audio data is sent to the device, the audio data may be removed from the remote system, such as by being deleted from memory associated with the remote system and/or caches associated with the remote system. In this way, the audio data is maintained by the remote system long enough to provide an audible response to the device, but then is removed to avoid long-term storage of the sensitive information associated with the response.

Additionally, or alternatively, the process 600 may include sending, to a personal device associated with the user account and within a period of time of sending the second audio data, the text data for presentation of the response by a display of the personal device. The process 600 may also include receiving, from the personal device, input data indicating a second request to display past requests and past responses to the past requests. The process 600 may also include causing, based at least in part on receiving the input data, display of text corresponding to the request and causing display of a redacted response to the request. In these examples, the redacted response may include a redacted instance of the portion of the text data identified as sensitive.

Additionally, or alternatively, the process 600 may include receiving, from the application, an indication that the portion of the first text data corresponds to a first sensitivity level designated as more sensitive than a second sensitivity level. Based at least in part on receiving the indication, causing the first text data and the encrypted text data to be removed from the system. The process 600 may also include generating second text data indicating that the first text data is unavailable for display and storing the second text data in association with the user account. The process 600 may also include receiving, from a personal device associated with the user account, input data indicating a second request to display past requests and past responses to the past requests. The process 600 may also include causing, based at least in part on receiving the input data, display of text corresponding to the second text data instead of the first text data.

Additionally, or alternatively, the process 600 may include generating redacted text data representing the audio data with a portion of the audio data redacted as sensitive, and storing the redacted text data in association with the user account. The process 600 may also include receiving, from a personal device associated with the user account, input data indicating a second request to display past requests and past responses to the past requests. The process 600 may also include sending, from receiving the input data, the redacted text data to the personal device instead of the audio data.

Additionally, or alternatively, the process 600 may include receiving, from the application, an indication that the portion of the text data corresponds to a first sensitivity level designated as more sensitive than a second sensitivity level. The process 600 may also include identifying a first encryption type associated with the first sensitivity level. In these examples, generating the encrypted text data may be based at least in part on first encryption type. The process 600 may also include generating, based at least in part on receiving the indication, encrypted audio data corresponding to the encrypted text data. In these examples, sending the audio data may include sending the encrypted audio data to the voice-enabled device.

Figure 7:
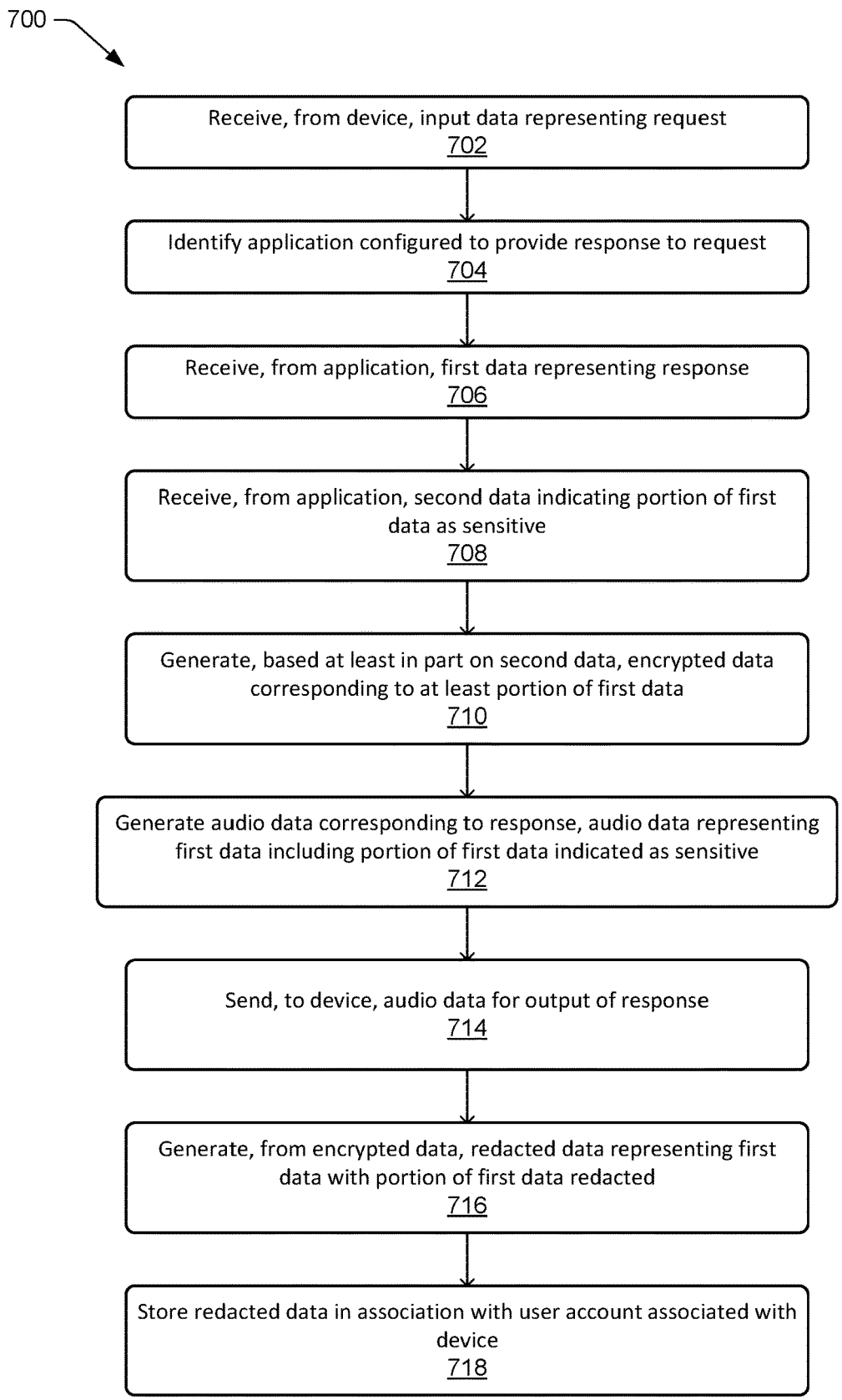
FIG. 7 illustrates a flow diagram of another example process for sensitive data management.

FIG. 7 illustrates a flow diagram of an example process 700 for sensitive data management. The order in which the operations or steps are described is not intended to be construed as a limitation, and any number of the described operations may be combined in any order and/or in parallel to implement process 700.

At block 702, the process 700 may include receiving, from a device, input data representing a request. For example, the input data may include audio data received from the device. In these examples, the audio data may represent a user utterance captured by microphones of the device. The device, for example, may include a voice-enabled device as described herein. In other examples, the input data may represent user input to a personal device.

At block 704, the process 700 may include identifying an application configured to provide a response to the request. For example, the intent data may indicate a determined intent associated with the user utterance as well as a payload and/or value associated with the intent. For example, for a user utterance of "what's the balance of my Bank A account," the NLU component may identify a "bank account balance" intent and the payload may be "Bank A." In this example where the intent data indicates an intent to receive information indicating an amount of money associated with a given account for Bank A, the remote system may call one or more speechlets to effectuate the intent. For example, a speechlet may be associated with Bank A and/or may have been developed by and/or in association with Bank A. The speechlet may be designated as being configured to handle the intent of identifying bank account balances, for example. The speechlet may receive the intent data and/or other data associated with the user utterance from the NLU component, such as by an orchestrator and/or a remote application component of the remote system, and may perform operations to instruct the device from which the input data was received and/or another device to provide information associated with the request. A dispatcher may receive the intent data and/or other data associated with the request from the speechlet.

At block 706, the process 700 may include receiving, from the application, first data representing the response. For example, the application may receive the intent data and/or other data from the dispatcher and may be configured to generate text data representing a response to the request. For example, the application may analyze the intent data and/or the text data as sent by the dispatcher and may generate responsive text data representing a response to the request. Using the example provided herein, the responsive text data may include "your Bank A account 1234 has a balance of $1,000" and/or "your doctor appointment at Hospital A is tomorrow at 9:00 am." The application may send this data, which may be text data, back to the speechlet and/or to the dispatcher.

At block 708, the process 700 may include receiving, from the application, second data indicating a portion of the text data as sensitive. For example, the application may identify, determine, and/or generate second data, which may also be described as designation data, and send that designation data to the speechlet and/or the dispatcher. For example, the second data may indicate a portion of the responsive text data that is sensitive and should be treated with a degree of confidentiality and/or sensitivity. The second data may be identified, determined, and/or generated by a SSML component and may correspond to one or more SSML tags. The SSML tags may be identified, determined, and/or generated by the remote system and may be made available to the application for sensitivity designation. The SSML tags may be associated with various sensitivity levels, which may be utilized to indicate how sensitive a particular portion of responsive text data is. The differing sensitivity level designations may be utilized by the remote system to determine how to encrypt data, how to store data, and/or how to redact data associated with the responsive text data. In other examples, the SSML tags may be identified, determined, and/or generated by the application and may be provided to the remote system.

At block 710, the process 700 may include generating, based at least in part on the second data, encrypted data corresponding to at least the portion of the first data. For example, the dispatcher, having received the responsive text data and the sensitive-information data, may then identify the portion of the responsive text data designated as sensitive. The responsive text data may be encrypted by the dispatcher in examples where the designation data indicates that at least a portion of the text data is sensitive. The encrypted text data may be sent to a validation component, which may attempt to validate the text data as a response to the request.

At block 712, the process 700 may include generating audio data corresponding to the response, the audio data representing the first data including the portion of the first data indicated as sensitive. For example, when the response is to be output audibly via speakers of the device, a TTS component may generate audio data that corresponds to the encrypted text data. The audio data may represent an audible response to the user utterance. In examples, the audio data may be generated by the TTS component and/or a subcomponent thereof. In other examples, the TTS component may be utilized to format the responsive text data and to send the text data to an external system, which may return the corresponding audio data. In examples when the response is to be displayed via a display of the device, the directive data may include the encrypted text data.

At block 714, the process 700 may include sending the audio data to the device. For example, the audio data representing the response may be sent to the voice-enabled device for output of corresponding audio by one or more of speakers of the device. As such, the device may provide a response to the user utterance that audibly presents the sensitive information. In other examples, the audio data may be sent to a personal device. In other examples, the response may be presented on displays of the device and/or on displays of the personal device. In these examples, instead of or in addition to audio data, the remote system may send text data to be utilized to present text representing the response. The text may be caused to be displayed for a predetermined amount of time in instances where the response includes sensitive information.

At block 716, the process 700 may include generating, from the encrypted data, redacted data representing the first data with the portion of the first data redacted. For example, where the response includes sensitive information, a publishing component, which may be configured to publish the text data and audio data to the activity-feed component, may be configured to redact the text data and/or the audio data before publishing. For example, the designation data may be utilized to identify the portion of a given response that is sensitive. The publishing component may then replace the sensitive portion of the response with a redacted version, such as replacing a bank account number and/or an account balance with asterisks and/or other forms of redaction. In these examples, the sensitive portion of the responsive text data may be deleted and replaced with the redacted text data and/or the text data in whole may be replaced with redacted text data.

At block 718, the process 700 may include storing the redacted data in association with a user account associated with the device. For example, the redacted text data may be sent to and stored with respect to the activity-feed component. In these examples, when user input indicates a request to view the above-identified interaction with the device, redacted text corresponding to the redacted text data may be displayed.

Additionally, or alternatively, the process 700 may include sending, to a personal device associated with the user account and within a period of time of sending the audio data, the first data for presentation of the response by the personal device. The process 700 may also include receiving, from the personal device, input data indicating a second request to display past requests and past responses to the past requests. The process 700 may also include causing, based at least in part on receiving the input data, display of text corresponding to the request and causing display of a redacted response to the request. In these examples, the redacted response may include a redacted instance of the portion of the first data identified as sensitive.

Additionally, or alternatively, the process 700 may include receiving, from the application, an indication that the portion of the first data corresponds to a first sensitivity level designated as more sensitive than a second sensitivity level. Based at least in part on receiving the indication, causing the first data and the encrypted data to be removed from the system. The process 700 may also include generating third data indicating that the first data is unavailable for display and storing the third data in association with the user account. The process 700 may also include receiving, from a personal device associated with the user account, input data indicating a second request to display past requests and past responses to the past requests. The process 700 may also include causing, based at least in part on receiving the input data, display of text corresponding to the third data instead of the first data.

Additionally, or alternatively, the process 700 may include receiving, from the application, an indication that the portion of the first data corresponds to a first sensitivity level designated as more sensitive than a second sensitivity level. The process 700 may also include identifying a first encryption type associated with the first sensitivity level. In these examples, generating the encrypted data may be based at least in part on first encryption type. The process 700 may also include generating, based at least in part on receiving the indication, encrypted audio data corresponding to the encrypted data. In these examples, sending the audio data may include sending the encrypted audio data to the voice-enabled device.

Additionally, or alternatively, the process 700 may include generating data designators. Some or all of the data designators may indicate at least one of an encryption type, a redaction type, or a storage type. In these examples, the designation data indicates a data designator selected from the data designators.

Additionally, or alternatively, the process 700 may include generating, based at least in part on the encrypted data, audio data representing the response and causing the audio data to be encrypted as encrypted audio data based at least in part on the designation data. The process 700 may also include sending the encrypted audio data to the device.

Additionally, or alternatively, the process 700 may include receiving, from the application, request-designation data indicating a portion of the request as sensitive. The process 700 may also include determining that the input data includes the portion of the request and causing the input data to be encrypted as encrypted input data. The process 700 may also include sending the encrypted input data to the application.

Additionally, or alternatively, the process 700 may include generating redacted data representing the input data with a portion of the input data redacted as sensitive. The process 700 may also include storing the redacted data in association with the user account and receiving, from a personal device associated with the user account, input data indicating a second request to display past requests and past responses to the past requests. The process 700 may also include sending, based at least in part on receiving the input data, the redacted data to the personal device instead of the input data.

Figure 8:
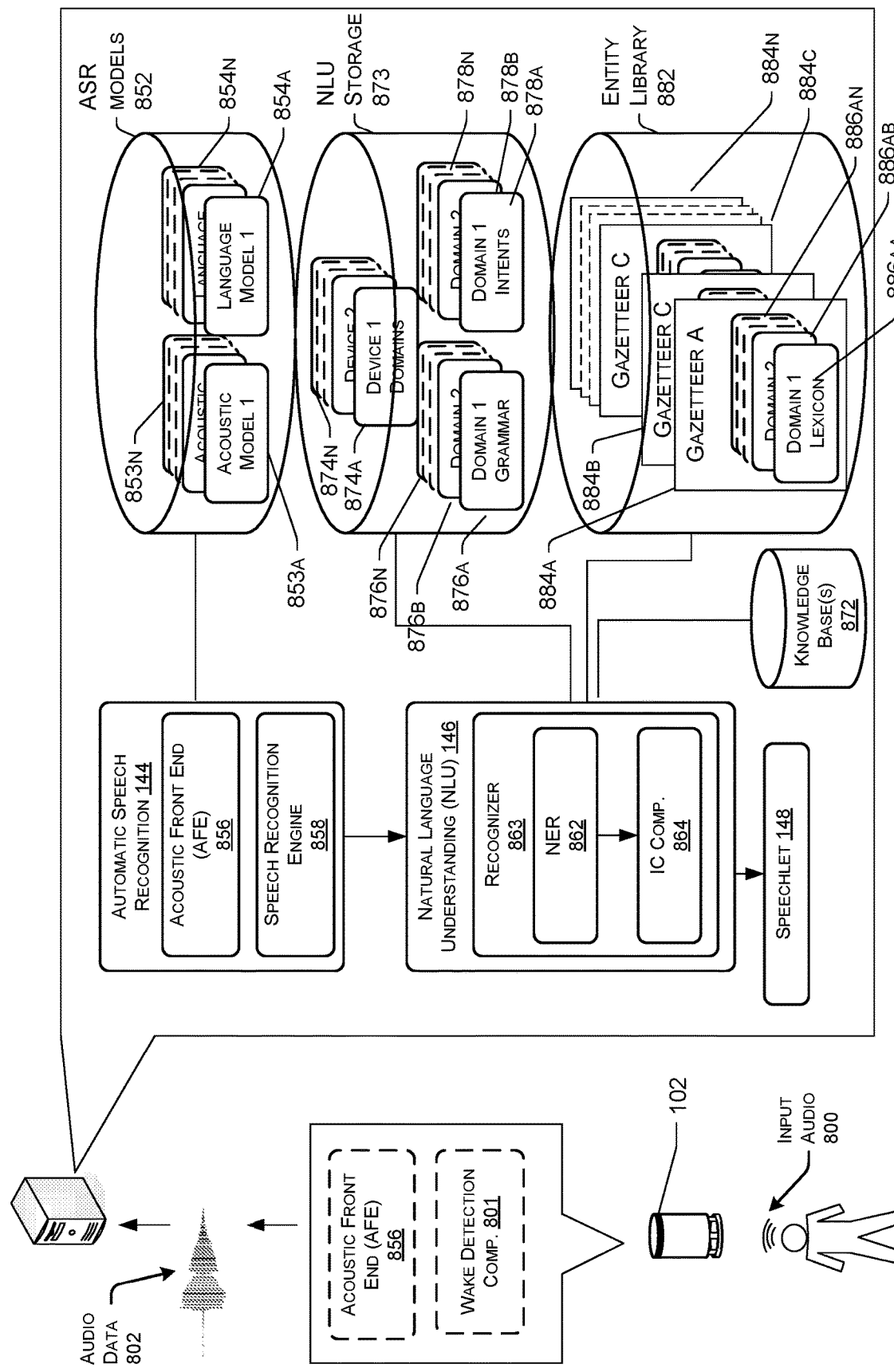
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake-word component 801, then processes audio data corresponding to the audio 800 to determine if a keyword (such as a wakeword) is detected in the audio data. Following detection of a wakeword, the device 102 sends audio data 802 corresponding to the utterance to the remote system 106 that includes an ASR component 144. The audio data 802 may be output from an optional acoustic front end (AFE) 856 located on the device prior to transmission. In other instances, the audio data 802 may be in a different form for processing by a remote AFE 856, such as the AFE 856 located with the ASR component 144 of the remote system 106.

The wake-word component 801 works in conjunction with other components of the user device, for example a microphone to detect keywords in audio 800. For example, the device may convert audio 800 into audio data, and process the audio data with the wake-word component 801 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 144 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 106 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what's my bank account balance." The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 858 may identify, determine, and/or generate text data corresponding to the user utterance, here "what's my bank account balance."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 146 (e.g., server 106) may include various components, including potentially dedicated processor(s), memory, storage, etc. As shown in FIG. 8, an NLU component 146 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 800) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action. For example, if a spoken utterance is processed using ASR 144 and outputs the text "what's my bank account balance" the NLU process may determine that the user intended to receive information associated with the monetary balance of a bank account known to the remote system.

The NLU may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "what's my 1234 bank account balance," "bank account balance" may be tagged as a command (to retrieve the monetary money associated with a bank account) and "1234" may be tagged as the naming identifier of the bank account in question.

To correctly perform NLU processing of speech input, an NLU process 146 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 146 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a bank account intent database may link words and phrases such as "balance," "amount," "money," to a "account balance" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "bank account balance" is an identified intent, a grammar (876) framework or frameworks may correspond to sentence structures such as "retrieve balance information for {bank account}."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "turn on office light," after failing to determine which device to operate, the NER component 862 may search the domain vocabulary for the phrase "office light". In the alternative, generic words may be checked before the gazetteer information, or both may be tried, potentially producing two different results.

The output data from the NLU processing (which may include tagged text, commands, etc.) may then be sent to a speechlet 148. The destination speechlet 148 may be determined based on the NLU output. For example, if the NLU output includes a command to send a message, the destination speechlet 148 may be a message sending application, such as one located on the user device or in a message sending appliance, configured to execute a message sending command. If the NLU output includes a search request, the destination speechlet 148 may include a search engine processor, such as one located on a search server, configured to execute a search command. After the appropriate command is generated based on the intent of the user, the speechlet 148 may provide some or all of this information to a text-to-speech (TTS) engine. The TTS engine may then generate an actual audio file for outputting the audio data determined by the speechlet 148 (e.g., "okay," or "your account balance is $1,000"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 9:
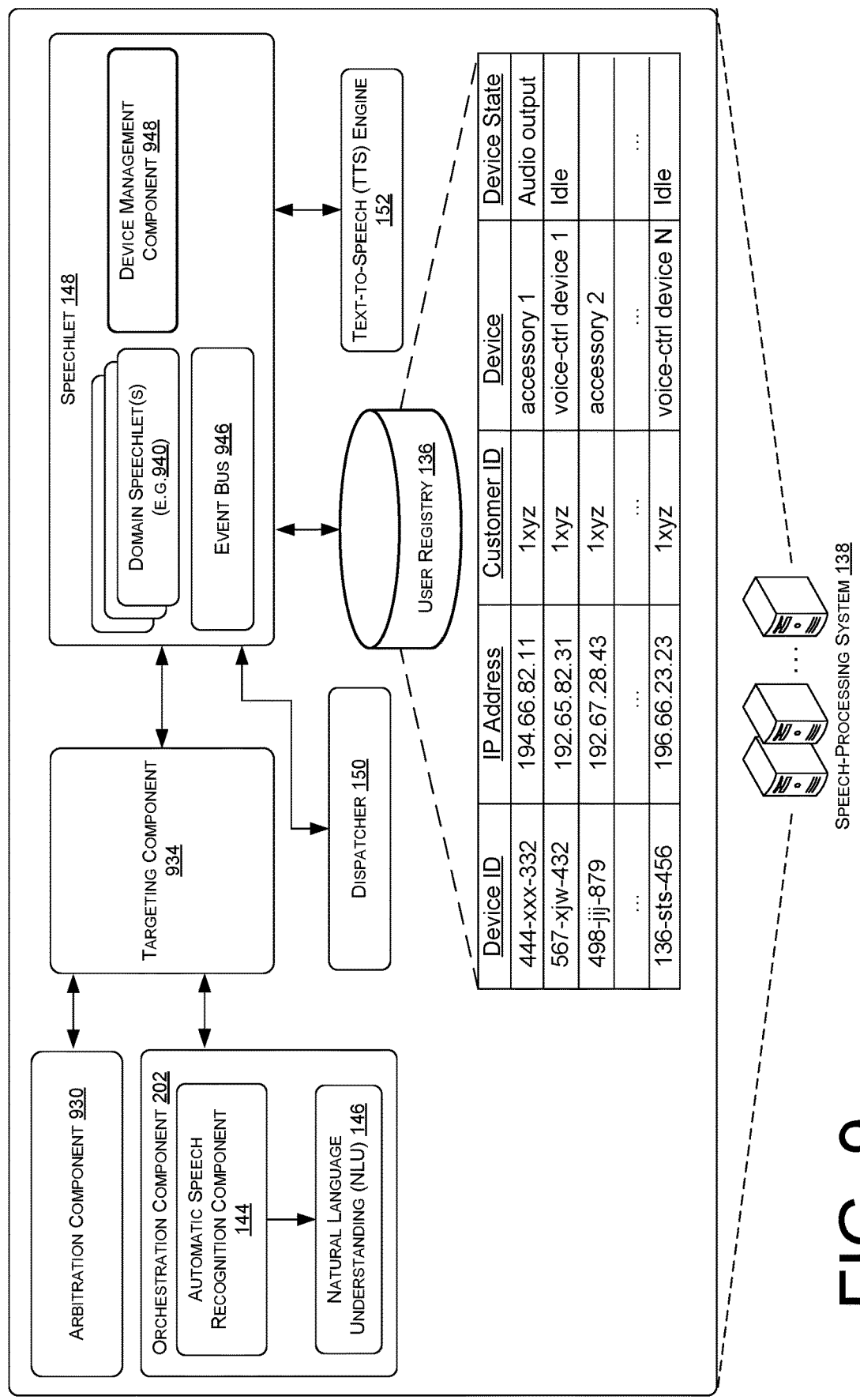
FIG. 9 illustrates a conceptual diagram of components of a speech-processing system for sensitive data management.

FIG. 9 illustrates a conceptual diagram of components of a speech-processing system 138 associating audio output commands with multiple devices, including a speechlet 148 configured to generate a command that the selected voice-enabled device uses to respond to a user utterance. As used with respect to FIG. 9, a voice-enabled device may include a voice-enabled device 102, such as described with respect to FIG. 1. As illustrated in FIG. 9, the speech-processing system 138, including the orchestration component 924 comprising the ASR component 144 and the NLU component 146, may be coupled to the targeting component 934 and provide the targeting component 934 with the intent determined to be expressed in the user utterance. Further, the arbitration component 930 may provide the ranked list of devices to the targeting component 934, as well as device indicators (e.g., IP addresses, devices names, etc.) for one or more of the voice-enabled devices in the ranked list of devices. The targeting component 934 may then perform techniques to determine a target device (e.g., a device to perform the requested operation), and provide various data to the speechlet 148. For instance, the targeting component 934 may provide the speechlet 148 with various device identifiers of the voice-enabled devices, the determined target device, the determined intent and/or command, etc.

The speechlet 148 and/or NLU component 146 may determine a domain based on the intent and, based on this determination, route the request corresponding to the audio data to the appropriate domain speechlet, such as the illustrated domain speechlets 940. The domain speechlet 940 may comprise any type of device or group of devices (e.g., hardware device, virtual devices or partitions, server, etc.), and may receive the text data and/or an intent associated with the audio signals and may determine how to respond to the request. For instance, the intent for a command "what's my bank account balance" may be routed to a speechlet that controls generation of directive data for sending to voice-enabled devices for outputting audio informing a user of a bank account balance.

Various types of domain speechlets 940 may be used to determine which devices to send commands to and/or to use in response to a user utterance, as well as the appropriate response and potential additional content (e.g., audio data). For example, the domain speechlets 940 may include a third party application domain speechlet 940, which may handle intents associated with banking, healthcare, gaming, productivity, etc., a music domain speechlet, which may handle intents associated with music play requests (e.g., Amazon Music, Pandora, Spotify, iHeart, etc.), and/or an information domain speechlet, which may handle requests for information associated, for example, with the status of a particular device and/or content being utilized and/or output by a particular device and/or group of devices.

After the domain speechlet 940 generates the appropriate command, which may be described herein as directive data, based on the intent of the user, and/or provides additional content, such as audio data, to be output by one of the voice-enabled devices, the domain speechlet 940 may provide this information back to the speech system 138, which in turns provides some or all of this information to a text-to-speech (TTS) engine 152. The TTS engine 152 then generates an actual audio file for outputting the second audio data determined by the domain speechlet 940. After generating the file (or "audio data"), the TTS engine 152 may provide this data back to the speech system 138.

The speech system 138 may then publish (i.e., write) some or all of this information to an event bus 946. That is, the speech system 138 may provide information regarding the initial request (e.g., the speech, the text, the domain/intent, etc.), the response to be provided to the voice-enabled device, or any other information pertinent to the interaction between the voice-enabled device and the speech-processing system 138 to the event bus 946.

Within the speech-processing system 138, one or more components or services may subscribe to the event bus 946 so as to receive information regarding interactions between user devices and the speech-processing system 138. In the illustrated example, for instance, the device management component 948 may subscribe to the event bus 946 and, thus, may monitor information regarding these interactions. In some examples, monitoring information in the event bus 946 may comprise messages between various components of the speech-processing system 138. For example, the targeting component 934 may monitor the event bus 946 to identify device state data for voice-enabled devices. In some examples, the event bus 946 may "push" or send indications of events and/or device state data to the targeting component 934. Additionally, or alternatively, the event bus 946 may be "pulled" where the targeting component 934 sends requests to the event bus 946 to provide an indication of device state data for a voice-enabled device. The event bus 946 may store indications of the device states for the devices, such as in a database (e.g., user registry 136), and using the stored indications of the device states, send the device state data for voice-enabled devices to the targeting component 934. Thus, to identify device state data for a device, the targeting component 934 may send a request to the event bus 946 (e.g., event component) to provide an indication of the device state data associated with a device, and receive, from the event bus 946, the device state data that was requested.

The device management component 948 functions to monitor information published to the event bus 946 and identify events that may trigger action. For instance, the device management component 948 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 948 may reference the user registry 136 to determine which voice-enabled devices are associated with secondary devices, as well as determine device types, states, and other capabilities of these secondary devices. For instance, the device management component 948 may determine, from the information published to the event bus 946, an identifier associated with the voice-enabled device making the corresponding request or the voice-enabled device selected to respond to or act upon the user utterance. The device management component 948 may use this identifier to identify, from the user registry 136, a user account associated with the voice-enabled device. The device management component 948 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 948 may determine whether a particular event identified is associated with supplemental content. That is, the device management component 948 may write, to a datastore, indications of which types of events and/or which primary content or responses are associated with supplemental content. In some instances, the speech-processing system 138 may provide access to third-party developers to allow the developers to register supplemental content for output on secondary devices for particular events and/or primary content. For example, if a voice-enabled device is to output that the weather will include thunder and lightning, the device management component 948 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 948 may store an association between the primary response or content (e.g., outputting of information regarding the world's largest mammal) and corresponding supplemental content (e.g., the audio data, image data, or the like). In some instances, the device management component 948 may also indicate which types of secondary devices are to output which supplemental content. For instance, in the instant example, the device management component 948 may store an indication that secondary devices of a class type "tablet" are to output a picture of a blue whale. In these and other instances, meanwhile, the device management component 948 may store the supplemental content in association with secondary-device capabilities (e.g., devices with speakers output the audio commentary, devices with screens output the image, etc.).

The device management component 948 may also determine how to transmit response and/or supplement content (and/or information acquiring the content) to the voice-enabled devices and/or the secondary devices. To make this determination, the device management component 948 may determine a device type of the voice-enabled devices and/or secondary devices, capabilities of the device(s), or the like, potentially as stored in the user registry 136. In some instances, the device management component 948 may determine that a particular device is able to communicate directly with the speech-processing system 138 (e.g., over WiFi) and, thus, the device management component 948 may provide the response and/or content directly over a network 108 to the secondary device (potentially via the speech system 138). In another example, the device management component 948 may determine that a particular secondary device is unable to communicate directly with the speech-processing system 138, but instead is configured to communicate with a voice-enabled device in its environment over short-range wireless networks. As such, the device management component 948 may provide the supplement content (or information) to the speech system 138, which in turn may send this to the voice-enabled device, which may send the information over a short-range network to the secondary device.

The speech-processing system 138 may further include the user registry 136 that includes data regarding user profiles as described herein. The user registry 136 may be located part of, or proximate to, the speech-processing system 138, or may otherwise be in message with various components, for example over the network 108. The user registry 136 may include a variety of information related to individual users, accounts, etc. that interact with the voice-enabled devices, and the speech-processing system 138. For illustration, the user registry 136 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 136 may store indications of associations between various voice-enabled devices and/or secondary device, such as virtual clusters of devices, states of devices, and associations between devices and audio-session queues. The user registry 136 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 148 and/or the domain speechlets 940 may determine, based on the stored device states in the user registry 136, a current device state of the voice-enabled devices. Rather than receiving device states for the voice-enabled devices, in metadata, the device states may already have been determined or received and stored in the user registry 136. Further, the user registry 136 may provide indications of various permission levels depending on the user. As an example, the speech system 138 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 946 may publish different events which indicate device states to various entities or components that subscribe to the event bus 946. For instance, if an event of "turn on office lights" occurs for a voice-enabled device, the event bus 946 may publish the indication of this event, and thus the device state of the voice-enabled device from which the audio data was received may be determined. Thus, various components, such as the targeting component 934, may be provided with indications of the various device states via the event bus 946. The event bus 946 may further store and/or update device states for the voice-enabled devices in the user registry 136. The components of the speech-processing system 138 may query the user registry 136 to determine device states.

The dispatcher 150 may be configured to receive intent data and/or other data associated with the request from the speechlet 148. The dispatcher 150 may be configured to identify and/or determine that the speechlet 148 and/or the request is associated with a third-party application, and the dispatcher 150 may send the intent data and/or the other data to the third-party application. For example, the dispatcher 150 may identify and/or determine that the request is associated with a third-party application for Bank A. The third-party application may have been developed by and/or in association with Bank A and/or may have been designated as corresponding to operations associated with Bank A. It should be understood that while the third-party application is depicted as a component of the speech-processing system 138, the third-party application may be a component of a third-party system. The dispatcher 150 may also be utilized to return data from the third-party application to the speechlet 148, such as text data corresponding to a response to a user utterance. The dispatcher 150 may also be utilized to encrypt data received from the speechlet 148 and/or from the third-party application.

A particular user profile may include a variety of data that may be used by the system 138. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
receiving, from a device, input data representing a request;
identifying an application configured to provide a response to the request;
receiving, from the application, first data representing the response;
determining that a first portion of the response is sensitive;
generating, based at least in part on the response including the first portion that is sensitive, audio data representing a second portion of the response that differs from the first portion of the response, the second portion selected based at least in part on the second portion differing from the first portion, the audio data excluding the first portion of the response; and
sending, to the device, the audio data for output of the response.

2. The method of claim 1, further comprising:
generating redacted data representing the first data with the first portion of the response redacted; and
storing the redacted data in association with user account data associated with the device.

3. The method of claim 2, further comprising:
receiving request data to display a representation of the response on a screen; and
sending, based at least in part on receiving the request data, the redacted data for display instead of the first data.

4. The method of claim 1, further comprising:
determining that the first portion of the first data is associated with a first sensitivity level designated as more sensitive than a second sensitivity level;
based at least in part on the first portion of the first data being associated with the first sensitivity level, generating second data indicating that the first data is unavailable for display;
receiving request data to display a representation of the response; and
causing, in response to the request data, display of a notification that the first data is unavailable.

5. The method of claim 1, further comprising:
receiving request data to display a representation of the response; and
causing, in response to the request data, display of the second portion of the response without display of the first portion of the response.

6. The method of claim 1, wherein determining that the first portion of the response is sensitive comprises determining that the first portion of the response is sensitive based at least in part on receiving, from a remote device associated with the application, an indication that the response includes sensitive information.

7. The method of claim 1, further comprising:
determining user account data associated with the device;
determining a personal device associated with the user account data; and
sending text data to the personal device, the text data representing a redacted instance of the response with the first portion of the response redacted.

8. The method of claim 1, further comprising:
generating second data representing a speech synthesis markup language (SSML) tag associated with a sensitivity designation for responses;
receiving an indication that the application has associated the SSML tag with the first data; and
wherein determining that the first portion of the response is sensitive comprises determining that the first portion of the response is sensitive based at least in part on the indication that the first data is associated with the SSML tag.

9. The method of claim 1, further comprising:
sending text data representing the first data to the device such that text corresponding to the text data is displayed on the device for a predetermined amount of time based at least in part on the first portion of the response being sensitive; and
causing the device to refrain from displaying the text in response to the predetermined amount of time lapsing.

10. The method of claim 1, further comprising, based at least in part on the first portion of the response being sensitive, causing the audio data to be deleted after sending the audio data to the device.

11. A system comprising:
one or more processors; and
computer-readable media storing computer-executable instructions that, when executed by the one or more processors, cause the one or more processors to perform operations comprising:
- receiving, from a device, input data representing a request;
- identifying an application configured to provide a response to the request;
- receiving, from the application, first data representing the response;
- determining, utilizing the first data, that a first portion of the response is sensitive;
- generating, based at least in part on the response including the first portion that is sensitive, audio data corresponding to the response, the audio data representing a second portion of the response that differs from the first portion of the response, the second portion selected based at least in part on the second portion differing from the first portion, the audio data excluding the first portion of the response; and
- sending, to the device, the audio data for output of the response.

12. The system of claim 11, the operations further comprising:
- generating redacted data representing the first data with the first portion of the response redacted; and
- storing the redacted data in association with an identifier of the input data.

13. The system of claim 12, the operations further comprising:
- receiving request data to present a representation of the response on a screen; and
- sending, based at least in part on receiving the request data, the redacted data for display instead of the first data.

14. The system of claim 11, the operations further comprising:
- determining that the first portion of the first data is associated with a first sensitivity level designated as more sensitive than a second sensitivity level;
- based at least in part on the first portion of the first data being associated with the first sensitivity level, generating second data indicating that the first data is unavailable for display;
- receiving request data to present a representation of the response; and
- causing, in response to the request data, display of a notification that the first data is unavailable.

15. The system of claim 11, the operations further comprising:
- receiving request data to display a representation of the response; and
- causing, in response to the request data, display of the second portion of the response without display of the first portion of the response.

16. The system of claim 11, wherein determining that the first portion of the response is sensitive comprises determining that the first portion of the response is sensitive based at least in part on receiving an indication that the response includes sensitive information, the indication received from a device associated with the application.

17. The system of claim 11, the operations further comprising:
- determining user account data associated with the device;
- determining a personal device associated with the user account data; and
- sending text data to the personal device, the text data representing a redacted instance of the response with the first portion of the response redacted.

18. The system of claim 11, the operations further comprising:
- generating second data representing speech synthesis markup language (SSML) tags associated with sensitivity designations for responses;
- receiving an indication that the application has associated at least one of the SSML tags with the first data; and
- wherein determining that the first portion of the response is sensitive comprises determining that the first portion of the response is sensitive based at least in part on the indication that the first data is associated with the at least one of the SSML tags.

19. The system of claim 11, the operations further comprising:
- sending text data representing the first data to the device;
- causing text corresponding to the text data to be displayed on the device for a predetermined amount of time based at least in part on the first data including the first portion of the first data indicated to be sensitive; and
- causing the device to refrain from displaying the text in response to the predetermined amount of time lapsing.

20. The system of claim 11, the operations further comprising, based at least in part on the first data including the first portion of the first data indicated to be sensitive, causing the audio data to be deleted after sending the audio data to the device.

* * * * *